US011360990B2

(12) United States Patent
Jagota

(10) Patent No.: US 11,360,990 B2
(45) Date of Patent: Jun. 14, 2022

(54) METHOD AND A SYSTEM FOR FUZZY MATCHING OF ENTITIES IN A DATABASE SYSTEM BASED ON MACHINE LEARNING

(71) Applicant: salesforce.com, inc., San Francisco, CA (US)

(72) Inventor: Arun Kumar Jagota, Sunnyvale, CA (US)

(73) Assignee: salesforce.com, inc., San Francisco, CA (US)

(*) Notice: Subject to any disclaimer, the term of this patent is extended or adjusted under 35 U.S.C. 154(b) by 380 days.

(21) Appl. No.: 16/449,335

(22) Filed: Jun. 21, 2019

(65) Prior Publication Data
US 2020/0401587 A1 Dec. 24, 2020

(51) Int. Cl.
| G06F 16/2458 | (2019.01) |
| G06N 20/00 | (2019.01) |
| G06F 40/295 | (2020.01) |

(52) U.S. Cl.
CPC ........ *G06F 16/2468* (2019.01); *G06F 40/295* (2020.01); *G06N 20/00* (2019.01)

(58) Field of Classification Search
CPC .... G06F 16/2468; G06F 40/295; G06N 20/00
USPC ........................................................ 707/780
See application file for complete search history.

(56) References Cited

U.S. PATENT DOCUMENTS

| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,386 A | 6/1998 | Lawrence et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,878,386 A | 3/1999 | Coughlin |
| 5,890,103 A | 3/1999 | Carus |
| 5,918,159 A | 6/1999 | Fomukong et al. |
| 5,930,746 A | 7/1999 | Ting |
| 5,956,676 A | 9/1999 | Shinoda |

(Continued)

OTHER PUBLICATIONS

Advisory Action, U.S. Appl. No. 13/034,463, dated Aug. 27, 2014, 4 pages.

(Continued)

*Primary Examiner* — Evan Aspinwall
(74) *Attorney, Agent, or Firm* — Nicholson, De Vos, Webster & Elliott, LLP

(57) ABSTRACT

A method and system of matching field values of a field type are described. Blurring operations are applied on a first and second values to obtain blurred values. A first maximum score is determined from first scores for blurred values, where each one of the first scores is indicative of a confidence that a match of the first and the second values occurs with knowledge of a first blurred value. A second maximum score is determined from second scores for the blurred values, where each one of the second scores is indicative of a confidence that a non-match of the first and the second values occurs with knowledge of the first blurred value. Responsive to determining that the first maximum score is greater than the second maximum score, an indication that the first value matches the second value is output.

18 Claims, 10 Drawing Sheets

(56) References Cited

U.S. PATENT DOCUMENTS

| | | |
|---|---|---|
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,694,307 B2 | 2/2004 | Julien |
| 6,711,565 B1 | 3/2004 | Subramaniam et al. |
| 6,718,325 B1 | 4/2004 | Chandra |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,043,690 B1 | 5/2006 | Bates et al. |
| 7,062,502 B1 | 6/2006 | Kesler |
| 7,299,235 B2 | 11/2007 | Sample |
| 7,340,411 B2 | 3/2008 | Cook |
| 7,356,482 B2 | 4/2008 | Frankland et al. |
| 7,401,094 B1 | 7/2008 | Kesler |
| 7,475,010 B2 | 1/2009 | Chao |
| 7,620,655 B2 | 11/2009 | Larsson et al. |
| 7,664,776 B1 | 2/2010 | Cameron |
| 7,698,160 B2 | 4/2010 | Beaven et al. |
| 7,730,478 B2 | 6/2010 | Weissman |
| 7,779,475 B2 | 8/2010 | Jakobson et al. |
| 7,851,004 B2 | 12/2010 | Hirao et al. |
| 7,908,240 B1 | 3/2011 | Mazzagatti et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,140,533 B1 | 3/2012 | Elmeleegy et al. |
| 8,209,308 B2 | 6/2012 | Rueben et al. |
| 8,219,533 B2 | 7/2012 | Bennett |
| 8,275,836 B2 | 9/2012 | Beaven et al. |
| 8,452,755 B1 | 5/2013 | Ye et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,521,758 B2 | 8/2013 | Nachnani et al. |
| 8,566,301 B2 | 10/2013 | Rueben et al. |
| 8,620,901 B2 | 12/2013 | Jagota et al. |
| 8,646,103 B2 | 2/2014 | Jakobson et al. |
| 8,667,012 B2 | 3/2014 | Fuchs et al. |
| 8,972,336 B2 | 3/2015 | Jagota |
| 9,026,552 B2 | 5/2015 | Jagota |
| 9,349,101 B2 | 5/2016 | Fuchs |
| 9,477,698 B2 | 10/2016 | Jagota |
| 9,619,534 B2 | 4/2017 | Jagota |
| 9,646,246 B2 | 5/2017 | Jagota |
| 9,740,743 B2 | 8/2017 | Jagota et al. |
| 9,760,620 B2 | 9/2017 | Nachnani et al. |
| 9,977,797 B2 | 5/2018 | Jagota et al. |
| 10,110,533 B2 | 10/2018 | Jagota |
| 10,152,497 B2 | 12/2018 | Doan et al. |
| 10,163,056 B2 | 12/2018 | Fuchs et al. |
| 10,354,264 B2 | 7/2019 | Jagota et al. |
| 10,373,046 B2 | 8/2019 | Jayant et al. |
| 10,397,249 B2 | 8/2019 | Gurkok et al. |
| 10,467,412 B2 | 11/2019 | Gurkok et al. |
| 2001/0013035 A1 | 8/2001 | Cohen |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0036900 A1 | 2/2003 | Weise |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0128140 A1 | 7/2003 | Xie et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0233224 A1 | 12/2003 | Marchisio et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0102303 A1 | 5/2005 | Russell et al. |
| 2005/0198157 A1 | 9/2005 | Young et al. |
| 2005/0210014 A1 | 9/2005 | Asano |

(56) References Cited

U.S. PATENT DOCUMENTS

| | | |
|---|---|---|
| 2005/0278139 A1 | 12/2005 | Glaenzer et al. |
| 2006/0106610 A1 | 5/2006 | Napper |
| 2006/0245641 A1 | 11/2006 | Viola et al. |
| 2006/0271573 A1 | 11/2006 | Letourneau |
| 2007/0067320 A1 | 3/2007 | Novak |
| 2007/0067622 A1 | 3/2007 | Nakano et al. |
| 2007/0219966 A1 | 9/2007 | Baylis et al. |
| 2007/0282595 A1 | 12/2007 | Tunning et al. |
| 2008/0221870 A1 | 9/2008 | Attardi et al. |
| 2009/0005116 A1 | 1/2009 | Sharma et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0234836 A1 | 9/2009 | Peng et al. |
| 2010/0115491 A1 | 5/2010 | Malron et al. |
| 2010/0241416 A1 | 9/2010 | Jiang et al. |
| 2010/0306185 A1 | 12/2010 | Smith et al. |
| 2010/0318511 A1 | 12/2010 | Phan et al. |
| 2011/0007887 A1 | 1/2011 | Green et al. |
| 2012/0089638 A1 | 4/2012 | Jagota et al. |
| 2012/0143923 A1 | 6/2012 | Whitney et al. |
| 2012/0232955 A1* | 9/2012 | Riazzi ............... G06Q 30/0204 705/7.32 |
| 2012/0233137 A1 | 9/2012 | Jakobson et al. |
| 2012/0284259 A1 | 11/2012 | Jehuda |
| 2013/0031061 A1 | 1/2013 | Jagota |
| 2013/0117191 A1 | 5/2013 | Jagota et al. |
| 2013/0117287 A1 | 5/2013 | Jagota et al. |
| 2013/0138698 A1 | 5/2013 | Harada et al. |
| 2013/0166489 A1* | 6/2013 | Jagota .................. G06Q 30/02 706/46 |
| 2013/0173520 A1 | 7/2013 | Clemencon et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0025683 A1 | 1/2014 | Howland et al. |
| 2014/0114927 A1 | 4/2014 | Anderson |
| 2014/0201838 A1 | 7/2014 | Varsanyi et al. |
| 2014/0359537 A1 | 12/2014 | Jackobson et al. |
| 2014/0372463 A1 | 12/2014 | Samantaray et al. |
| 2015/0007050 A1 | 1/2015 | Jakobson et al. |
| 2015/0032729 A1 | 1/2015 | Nachnani et al. |
| 2015/0046464 A1 | 2/2015 | Raiber et al. |
| 2015/0095162 A1 | 4/2015 | Jakobson et al. |
| 2015/0172563 A1 | 6/2015 | Jakobson et al. |
| 2015/0370478 A1 | 12/2015 | Okajima et al. |
| 2016/0110354 A1 | 4/2016 | Jagota et al. |
| 2016/0125197 A1 | 5/2016 | Winters |
| 2016/0125347 A1 | 5/2016 | Jagota et al. |
| 2016/0125442 A1 | 5/2016 | Jagota et al. |
| 2016/0140355 A1 | 5/2016 | Jagota et al. |
| 2016/0342636 A1 | 11/2016 | Braghin et al. |
| 2016/0378759 A1 | 12/2016 | Jagota et al. |
| 2016/0379265 A1 | 12/2016 | Jagota et al. |
| 2016/0379266 A1 | 12/2016 | Jagota et al. |
| 2017/0060919 A1 | 3/2017 | Ramachandran et al. |
| 2017/0061325 A1 | 3/2017 | Jagota et al. |
| 2017/0091270 A1* | 3/2017 | Guo ................. G06F 16/24544 |
| 2017/0242891 A1 | 8/2017 | Doan et al. |
| 2017/0277768 A1 | 9/2017 | Doan et al. |
| 2017/0286441 A1 | 10/2017 | Doan et al. |
| 2017/0316361 A1 | 11/2017 | Jagota et al. |
| 2018/0157988 A1 | 6/2018 | Jagota et al. |
| 2018/0165281 A1* | 6/2018 | Jagota ................ G06F 16/2379 |
| 2018/0165294 A1 | 6/2018 | Jagota et al. |
| 2018/0165354 A1 | 6/2018 | Jagota et al. |
| 2018/0373732 A1 | 12/2018 | Jagota et al. |
| 2019/0236178 A1 | 8/2019 | Jagota et al. |
| 2019/0236460 A1 | 8/2019 | Jagota et al. |
| 2019/0236475 A1 | 8/2019 | Jagota et al. |
| 2020/0134683 A1 | 4/2020 | Boren et al. |
| 2020/0176098 A1* | 6/2020 | Lucas .................... G06F 40/30 |
| 2020/0242112 A1 | 7/2020 | Jagota |
| 2020/0250576 A1 | 8/2020 | Jagota et al. |
| 2020/0250687 A1 | 8/2020 | Jagota et al. |
| 2020/0356574 A1 | 11/2020 | Jagota et al. |

OTHER PUBLICATIONS

Advisory Action, U.S. Appl. No. 13/034,463, dated Jan. 26, 2016, 3 pages.

Advisory Action, U.S. Appl. No. 13/773,141, dated Oct. 19, 2015, 2 pages.

Final Office Action, U.S. Appl. No. 13/034,463, dated Aug. 5, 2016, 24 pages.

Final Office Action, U.S. Appl. No. 13/034,463, dated Aug. 26, 2013, 17 pages.

Final Office Action, U.S. Appl. No. 13/034,463, dated Feb. 3, 2015, 19 pages.

Final Office Action, U.S. Appl. No. 13/034,463, dated May 29, 2014, 17 pages.

Final Office Action, U.S. Appl. No. 13/034,463, dated Oct. 1, 2015, 21 pages.

Final Office Action, U.S. Appl. No. 13/773,141, dated Jun. 22, 2015, 18 pages.

Final Office Action, U.S. Appl. No. 13/773,141, dated Mar. 18, 2016, 18 pages.

Final Office Action, U.S. Appl. No. 13/773,141, dated Nov. 24, 2014, 19 pages.

Kang et al., "Schema Matching Using Interattribute Dependencies", IEEE Transactions on Knowledge and Data Engineering, vol. 20, No. 10, Oct. 2008, pp. 1393-1407.

Non-Final Office Action, U.S. Appl. No. 13/034,463, dated Feb. 18, 2016, 23 pages.

Non-Final Office Action, U.S. Appl. No. 13/034,463, dated Jan. 8, 2014, 19 pages.

Non-Final Office Action, U.S. Appl. No. 13/034,463, dated Mar. 28, 2013, 16 pages.

Non-Final Office Action, U.S. Appl. No. 13/034,463, dated May 29, 2015, 22 pages.

Non-Final Office Action, U.S. Appl. No. 13/034,463, dated Nov. 13, 2014, 17 pages.

Non-Final Office Action, U.S. Appl. No. 13/773,141, dated Jul. 2, 2014, 19 pages.

Non-Final Office Action, U.S. Appl. No. 13/773,141, dated Jul. 5, 2016, 15 pages.

Non-Final Office Action, U.S. Appl. No. 13/773,141, dated Mar. 12, 2015, 15 pages.

Non-Final Office Action, U.S. Appl. No. 13/773,141, dated Nov. 12, 2015, 17 pages.

Non-Final Office Action, U.S. Appl. No. 13/773,286, dated Jul. 2, 2014, 18 pages.

Non-Final Office Action, U.S. Appl. No. 15/374,924, dated Sep. 19, 2019, 6 pages.

Notice of Allowance, U.S. Appl. No. 13/034,463, dated Dec. 2, 2016, 7 pages.

Notice of Allowance, U.S. Appl. No. 13/773,141, dated Dec. 30, 2016, 7 pages.

Notice of Allowance, U.S. Appl. No. 13/773,286, dated Oct. 21, 2014, 7 pages.

Notice of Allowance, U.S. Appl. No. 15/374,924, dated Jan. 2, 2020, 7 pages.

Notice of Allowance, U.S. Appl. No. 15/496,905, dated Jun. 24, 2020, 8 pages.

Office Action, EP App. No. 15/590,371, dated Jun. 25, 2020, 9 pages.

Office Action, EP App. No. 15/590,371, dated Nov. 15, 2019, 22 pages.

Warren et al., "Multi-column Substring Matching for Database Schema Translation", ACM, VLDB '06: Proceedings of the 32nd international conference on Very large data base, Sep. 12-15, 2006, 12 pages.

* cited by examiner

RECEIVE A TRAINING DATA SET OF PAIR OF VALUES, WHERE EACH PAIR OF VALUES INCLUDES A FIRST VALUE AND A SECOND VALUE OF A FIELD TYPE FROM A PLURALITY OF FIELD TYPES, AND WHERE EACH PAIR OF VALUES IS ASSOCIATED WITH A CLASS INDICATING WHETHER THE FIRST VALUE AND THE SECOND VALUE MATCH
222

FOR EACH PAIR OF VALUES AND ASSOCIATED CLASS

APPLY, BASED ON THE FIRST FIELD TYPE, A SET OF ONE OR MORE BLURRING OPERATIONS ON THE FIRST VALUE AND THE SECOND VALUE TO OBTAIN ONE OR MORE BLURRED VALUES
224

DETERMINE, BASED ON A BLURRING LEVEL, A WEIGHT TO BE ASSOCIATED WITH EACH ONE OF THE BLURRED VALUES
226

FOR EACH OF THE BLURRED VALUES ASSOCIATE THE CLASS
228

OUTPUT AN AUGMENTED TRAINING DATA SET INCLUDING THE VALUES AND THE BLURRED VALUES WITH ASSOCIATED CLASSES, WHERE THE AUGMENTED TRAINING DATA SET IS TO BE USED TO TRAIN A STATISTICAL CLASSIFIER FOR MATCHING VALUES OF A PLURALITY OF FIELD TYPES
230

Figure 2B

METHOD AND A SYSTEM FOR FUZZY MATCHING OF ENTITIES IN A DATABASE SYSTEM BASED ON MACHINE LEARNING

TECHNICAL FIELD

One or more implementations relate to the field of database systems; and more specifically, to the fuzzy matching of entities in a database system based on machine learning.

BACKGROUND ART

A database may comprise one or more database objects that are managed by a Database Management System (DBMS), each database object may include a number of records, and each record may comprise of a set of fields. A record may take different forms based on the database model being used and/or the specific database object to which it belongs; for example, a record may be: 1) a row in a table of a relational database; 2) a JavaScript Object Notation (JSON) document; 3) an Extensible Markup Language (XML) document; 4) a key-value pair; etc. A database object can be unstructured or have a structure defined by the DBMS (a standard database object) and/or defined by a user (custom database object).

A record typically includes multiple values of different field types. Each field type represents a different type of information for the record. For example, a database system may include records representing contact persons. A record of a contact person can include one or more of the following fields: first name, last name, phone number, email address, street address, city, zip code, and one or more additional fields that may be specific to a contact person or the identification of the record in the database system.

Typical field matching mechanisms are based on string similarity. However, some field types can be quite intricate and properly identifying a contact person in the database system can be challenging with these techniques. For the system may need to apply a fuzzy matching over one or more of the field values. For example, a matching mechanism should allow Andy and Andrew to be a valid match, while not allowing Eric and Erica to be a valid match. However, matching mechanisms based on string similarities predict the opposite. Fuzzy matching mechanisms allows to address the limitations of matching mechanisms based on string similarity.

Fuzzy matching of a first field value allows to determine a corresponding second field value that matches the first field value even if the first field value is not identical to the second field value. This can be particularly useful when attempting to match field values of contact person records in which different spellings of a name can be valid or data of a first field value is incomplete when compared with the data of the second field value, etc.

Fuzzily matching field values of contact person records involves the ability to fuzzily match pairs of values of a given field type. In the example of the contact person provided herein, pairs of first names, pairs of last names, pairs of phone numbers, pairs of street addresses, pairs of cities, or pairs of zip codes need to be matched.

Current approaches of fuzzy matching use a specific field matcher for each field type that is to be matched. In these approaches a field matcher is built and trained for each field type resulting in multiple field matchers for processing the multiple fields of a record.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

FIG. 2B is a flow diagram illustrating exemplary operations of training a field matcher with an augmented training data set according to some example implementations.

DETAILED DESCRIPTION

Figure 1A:
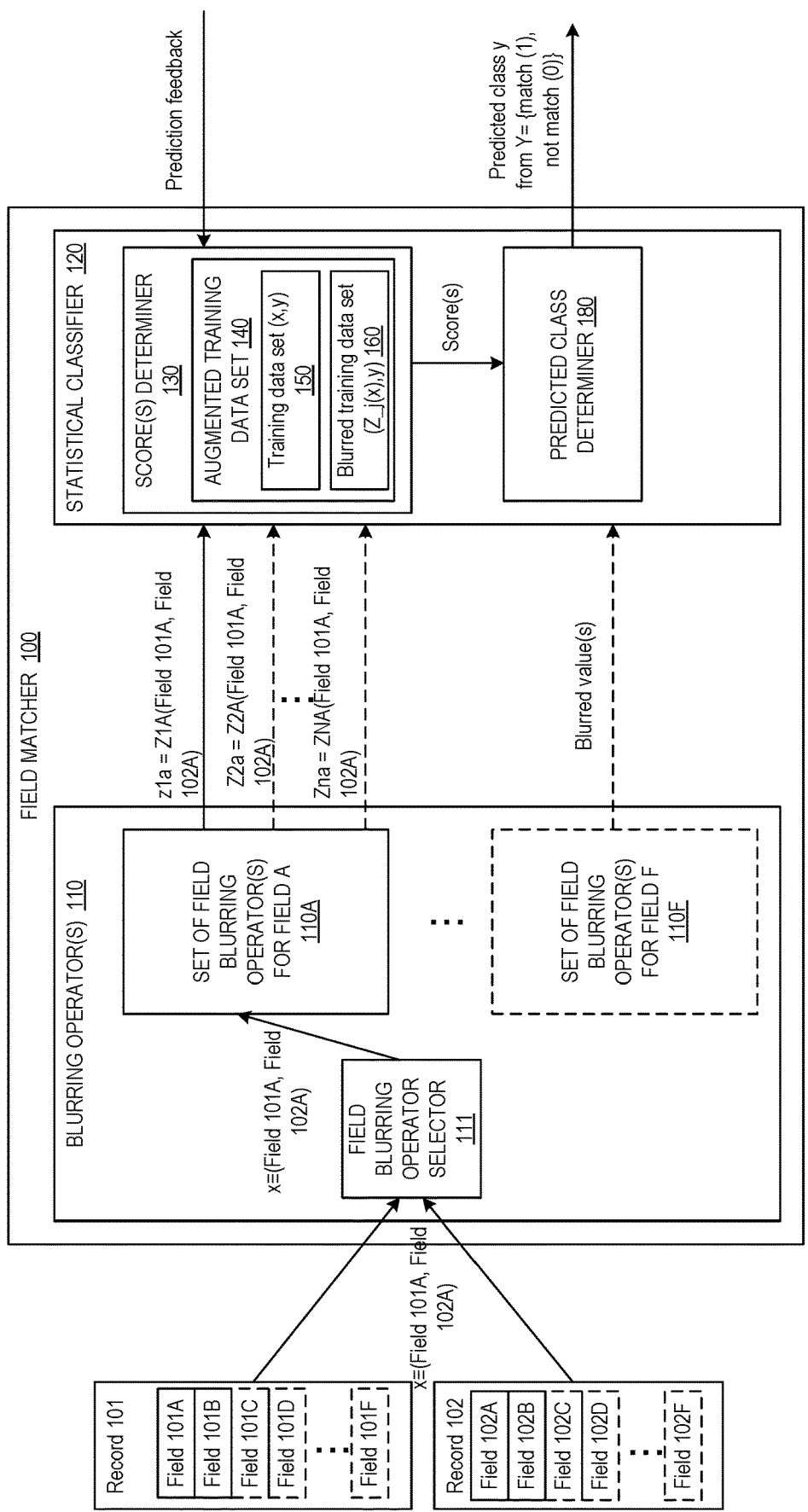
FIG. 1A is a block diagram illustrating a field matcher according to some example implementations.

The following description describes methods and apparatus for fuzzy matching of entities of a record type in a database system.

Existing Fuzzy Matching of Field Values

Given that field types differ from one another, existing mechanisms of fuzzy matching of fields, involve building a fuzzy matcher for each one of the field types. As the matching scenarios for the various field types differ from one another. Building each such fuzzy matcher involves significant field-specific complexity, trial and error, and complex maintenance mechanisms.

In addition to the complexity in designing and maintaining the multiple field-specific fuzzy matchers, these matchers are imperfect in that they may miss any true matches (i.e., two field values that should match will be returned as a non-match by the matchers, these matches can be referred to as false negative matches) or may produce false matches (i.e., two field values that are not a match are output as a match by the matchers, these matches can be referred to as false positive matches). This implies that errors happen during the course of execution of the matchers and new errors are likely to unfold over time. To address and mitigate these errors, a significant amount of effort needs to be invested in modifying each one of the field specific matchers and in some cases, the correction of the errors and modifications of the matchers may not be feasible.

Further, all scenarios characterizing when and when not two field values should match cannot be known up-front, i.e., before the field-specific matchers are deployed. Unforeseen errors often emerge at a later stage when the fuzzy field-specific matchers are in use. The identification of these errors at this late stage (after deployment and use by customers for example), requires a significant amount of effort and time to include any modification to the field-specific matchers following their deployment. This can be extremely disruptive to users of the fuzzy matchers. In addition, the tolerance of the fuzzy matchers to false positives (records that are identified as a match when they are not a match) has a high cost on the system and is likely to cause the introduction of corrupted data.

Enhanced Fuzzy Matching of Field Values:

The implementations described herein present a fuzzy matching mechanism of field values of one or more field types. The fuzzy matching mechanism relies on a single machine learning mechanism that can be used for different field types. The machine learning mechanism is a statistical classifier that receives as input blurred values of a given input and outputs a class from a set of classes for the input. The input is comprised of a pair of field values that are to be matched. The blurred values are generated based on the input and based on blurring operator(s). The blurring operator(s) are selected from multiple blurring operator(s) based on the field type of the field values forming the input. Each one of the blurring operator(s) is designed for a particular field type and enables the generation of blurred values that are to be input to the statistical classifier. As it will be shown herein below in more detail, the solution described herein of fuzzy matching greatly reduces the complexity of maintaining the field matching mechanism by having a single machine learning mechanism that can be applied to data from different field types.

In addition, the fuzzy matching mechanism can be continuously updated based on prediction feedback to improve the prediction. Thus, when an error in the prediction occurs, the prediction feedback is used to retrain the classification model of the fuzzy matching mechanism. Over time, the fuzzy matching mechanism improves in precision and accuracy.

In one implementation, a method and system of matching field values of a field type are described. A first value of a first field type and a second value of the first field type are received. A first subset of one or more of a plurality of blurring operations is applied on the first value and the second value to obtain a first set of blurred values. A first maximum score is determined from first scores for blurred values of the first set of blurred values, where the first maximum score is greater than or equal to other scores of the first scores, and each one of the first scores is indicative of a confidence that a match of the first value and the second value occurs with knowledge of a respective first blurred value from the first set of blurred values. A second maximum score is determined from second scores for the blurred values of the first set of blurred values, where the second maximum score is greater than or equal to other scores from the second scores, and each one of the second scores is indicative of a confidence that a non-match of the first value and the second value occurs with knowledge of the respective first blurred value from the first set of the blurred values. Responsive to determining that the first maximum score is greater than the second maximum score, an indication that the first value matches the second value is output.

FIG. 1A is a block diagram illustrating a field matcher 100 according to some example implementations. The field matcher 100 is operative to perform the operations of a fuzzy matching mechanism. The field matcher 100 is operative to receive an input x from a set of inputs X and predict a predicted class y from the set of predicted classes Y. The input x typically includes a set of two field values (e.g., x=(Field 101A, Field 102A)) of a same field type. For example, the fields 101A and 102A can be of a field type that is part of a set of fields of a respective record, record 101 and record 102, stored in a database system. Each field type represents a different type of information for the record. For example, a database system may include records representing contact persons. A record of a contact person can include one or more of the following fields: first name, last name, phone number, email address, street address, city, zip code, and one or more additional fields that may be specific to a contact person or the identification of the record in the database system. In some implementations, the fields 101A and 102A are of a same field type such as a name (first, last or full name), a city name, a street address, a postal code, a phone number, etc. While the implementations herein will be described with respect to field types related to a record of type contact person, in other implementations the records types and the field types can be different.

The predicted class y includes an indication of whether the values included in the input x match or not. For example, the predicted class y may have a value from the set $Y=\{0,1\}$, where 1 indicates that there is a match and 0 indicates that there is no match. While in the implementations described herein the predicted class has a binary value (0 or 1), in other implementations, similar mechanisms can be used for multi-class prediction where the set of predicted values Y can include three or more values, without departing from the scope of the present inventive concept.

The field matcher 100 includes a set of blurring operators 110 and a statistical classifier 120. The blurring operator(s) 110 are operative to generate from the input x a set of one or more blurred values B(x) that are fed to the statistical classifier 120.

The blurring operator(s) 110 includes a field blurring operator selector 111 and multiple sets of field blurring operator(s) 110A-N. The field blurring operator selector 111 is operative to receive an input x including two field values 101A and 102A for which a classification is to be determined (match or not match). The field blurring operator selector 111 determines based on the type of the field values which one of the multiple sets of field blurring operator(s) 110A-N is to be used to process the field values and output blurred values. For example, upon determining that field values 101A and 102A are of field type A, the input x is transmitted to the set of field blurring operator(s) 110A that is operative to process field values of that type.

The multiple sets of field blurring operators 110A-F can include one or more sets of field blurring operator(s), where each set of field blurring operator(s) is adapted to generate from an input x blurred values that are to be used by the statistical classifier 120 for performing a match prediction for the input x. Each one of the sets of field blurring operator(s) 110A-F is adapted to process inputs of a given field type. For example, the blurring operator(s) 110 may include a first set of field blurring operator(s) 110A that is to be applied for field values of type A. The blurring operator(s) 110 may further include one or more additional set of field blurring operator(s) such as 110F that are respectively specific to one or more additional field types different from the field of type A.

As will be described in further details with reference to FIGS. 1B-1F, each one of the sets 110A-F may include one or more blurring operators. Each one of the blurring operator(s) may receive one or two field values as input and outputs a blurred value. A blurring operator blurs certain details of the input x by transforming x into a value z, in which an amount of information on x is lost. The amount of information lost can vary based on the type of blurring that is applied on x.

The field matcher 100 includes a statistical classifier 120. The statistical classifier 120 can operate in two different phases. A first phase of operation that is a training phase, in which an augmented data set 140 is used to train the statistical classifier and determine a classification model. In some implementations, the field matcher 100 may receive prediction feedback that can further be used to update the classification model during subsequent training phases. In these implementations, the classification model can be continuously updated upon receipt of the feedback regarding past predictions.

During a second phase, i.e., the prediction phase, the statistical classifier 120 is operative to receive blurred values from the blurring operator(s) 110 and predict a predicted class y for an input x based on the blurred values. The statistical classifier 120 identifies to which of a set of categories/classes from the set Y a new observation x belongs. Unlike standard statistical classifiers, the statistical classifier 120 does not use features associated with the input to make a prediction for that input. Instead, the statistical classifier 120 uses blurred values generated from the input x. Statistical classifier 120 is operative to receive blurred values for different field types and is operative to make a prediction for inputs of different field types. Thus, in the implementations described herein, the same statistical classifier is used for inputs of multiple field types.

The statistical classifier 120 includes a score(s) determiner 130 and a predicted class determiner 180. The scores determiner 130 is operative to determine one or more scores based on the blurred values of an input x and the classification model determined during the training phase. The score(s) determiner 130 determines the scores based on an augmented training set of data 140. The augmented training set of data 140 includes a training data set 150 containing observations (or instances) whose category/class membership is known (x, y). The augmented training set of data 140 further includes a blurred training data set 160, which includes blurred training data ($Z_j(x)$, y) generated from the training data set 150. The scores are fed to the predicted class determiner 180, which is operative to determine a predicted class y for the input x based on the input scores.

In operation, a first and a second value of a first field type are received (e.g., Field 101A and Field 102A). A first subset of one or more of a plurality of blurring operations (e.g., 110A) is applied on the first value and the second value to obtain a first set of blurred values (e.g., z1a, z2a, . . . , zna). A first maximum score is determined from first scores for blurred values of the first set of blurred values, where the first maximum score is greater than or equal to other scores of the first scores, and each one of the first scores is indicative of a confidence that a match of the first value and the second value occurs with knowledge of a respective first blurred value from the first set of blurred values. A second maximum score is determined from second scores for the blurred values of the first set of blurred values, where the second maximum score is greater than or equal to other scores from the second scores, and each one of the second scores is indicative of a confidence that a non-match of the first value and the second value occurs with knowledge of the respective first blurred value from the first set of the blurred values. Responsive to determining that the first maximum score is greater than the second maximum score, a predicted class y is outputs as an indication that the first value matches the second value is output.

The field matcher 100 presents a fuzzy matching mechanism that allows to fuzzily match field values of a record. This enables two instances of a field type to match even if the two instances are not identical. For example, the field matcher 100 may be tolerant to matching names with transposition errors (e.g., George, Goerge), substitution error (e.g., Jonathan, Jonethan), plausible phonetic variations, (e.g., Joseph, Josef), or an insertion or a deletion (e.g., (Richardson, Richrdson). The field matcher 100 allows to identify and ignore superficial differences such as Mr. John, John. The use of the blurred values to predict and continuously update the prediction model for a pair of field values allows for this flexibility of the matching mechanism and allows to match two field values even when these values are not identical.

Further, the fuzzy matching mechanism relies on a single machine learning mechanism (statistical classifier 120) that can be used for different field types. The solution described herein of fuzzy matching greatly reduces the complexity of maintaining the field matching mechanism by having a single machine learning mechanism that can be applied to data from different field types.

In addition, the fuzzy matching mechanism can be continuously updated based on prediction feedback to improve the prediction. Thus, when an error in the prediction occurs, the prediction feedback is used to retrain the classification model of the fuzzy matching mechanism. Over time, the fuzzy matching mechanism improves in precision and accuracy.

Blurring Operations

FIGS. 1B-F illustrate exemplary blurring operators that can be used for different types of fields. The various field types described herein generally relate to fields of a record of type contact. While the implementations herein will be described with reference to the following types of fields: person name, postal code, phone number, city name, and street address, this should not be considered as a limitation of the present inventive concept. The types of fields described herein are presented for illustrative purposes and other types of fields can be contemplated.

Blurring Operation(s) for Field Values of Type Name:

In some implementations, the field values to be matched are of type name. For example, the field values can be values full names, first names, or last names.

Figure 1B:
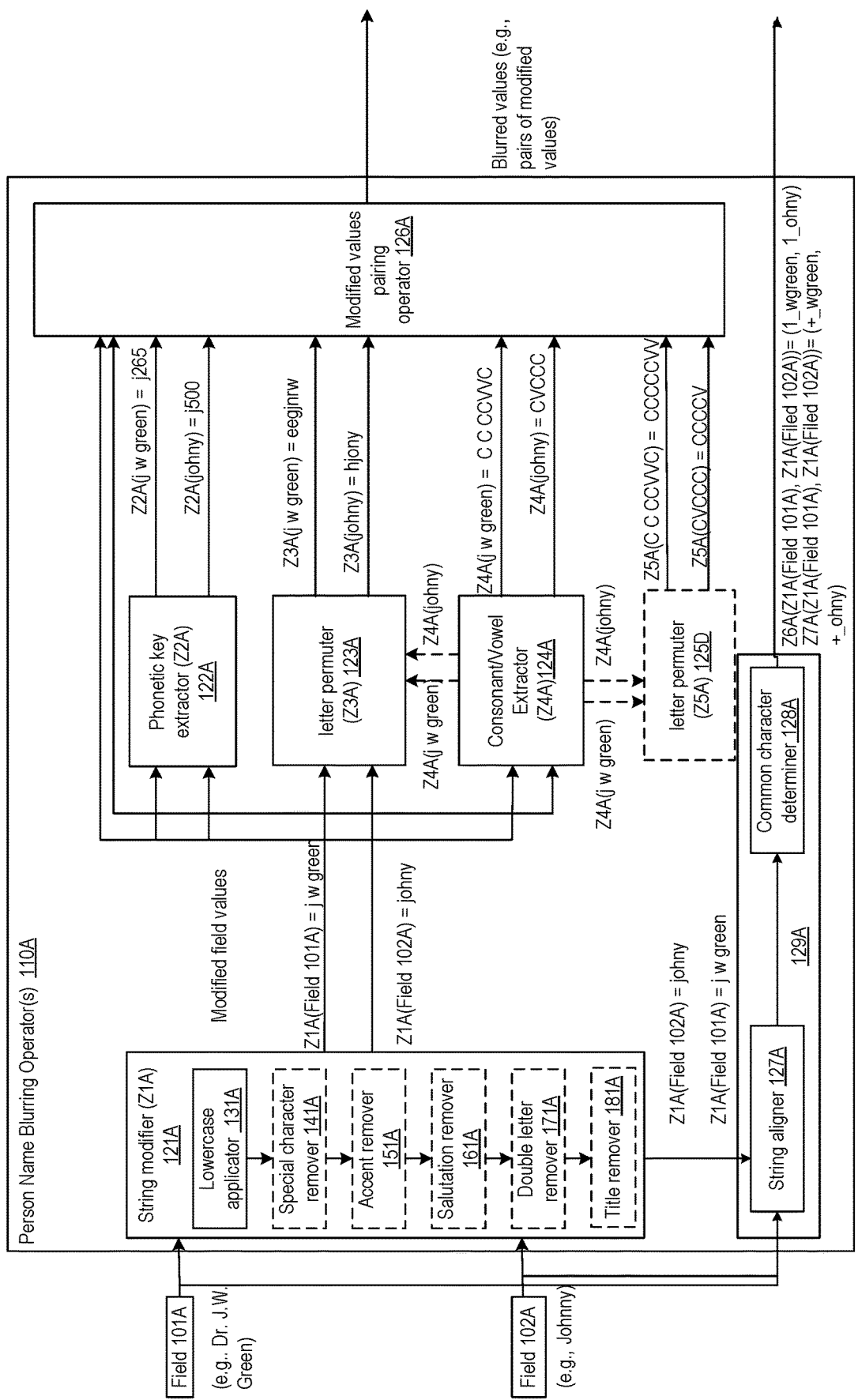
FIG. 1B is a more detailed block diagram illustrating a person name blurring operator according to some example implementations.

FIG. 1B is a more detailed block diagram illustrating a person name blurring operator according to some example implementations. The person name blurring operator (PNBO) 110A receives a first field value 101A and a second field value 102A of a first field type. In this example, the field type is full name. In other implementations, the field type can be first name or alternatively last name. The PNBO 110A includes one or more blurring operators that transform field values into modified field values. In some implementations, the PNBO 110A may include several blurring operators that receive the following inputs and result in the output described below:

$$\text{For field value } U \rightarrow Z1A(u) = z\_1 \tag{1}$$

$$z\_1 \rightarrow Z2A(z\_1) = z\_2 \tag{2}$$

$$z\_1 \rightarrow Z3A(z\_1) = z\_3 \tag{3}$$

$$z\_1 \rightarrow Z3A(z\_1) = z\_4 \tag{4}$$

$$z\_3 \rightarrow Z3A(z\_3) = z\_5 \tag{5}$$

The PNBO 110A includes a string modifier 121A (Z1A). The string modifier 121A receives the strings of field values 101A and 102A (e.g., Dr. K. W. Green, and Johnny) and modifies the string based on one more operations 131A, 141A, 151A, 161A, 171A, or 181A. In some implementations, each one of the operations 131A, 141A, 151A, 161A, 171A, or 181A is applied on each one of the field values 101A and 102A. In other implementations, a subset that is less than the entire set of operations 131A, 141A, 151A, 161A, 171A, or 181A is applied on each one of the field values 101A and 102A. The string modifier 121A includes one or more of lowercase applicator 131A, a special character remover 141A, an accent remover 151A, a salutation remover 161A, a double letter remover 171A, and a title remover 181A. The lowercase applicator 131A transforms each received field value (e.g., Dr. J. W. Green) into a lowercase string (e.g., dr. j. w. green). The special character remover 141A transforms an input by removing any special characters (such as periods, single quotation marks, etc.) from the string. For example, the special character remover 141A may transform dr. j. w. green into dr j w green. The accent remover 151A removes any accents that may be present on a letter of the field value. The salutation remover 161A strips the salutations from a field value of type name. The double letter remover 171A removes any consonants that are doubled (e.g., johnny is transformed into johny). The title remover 181A removes any titles that may be present at the end of the name (e.g., PhD, MsC, etc.). In some implementations, all of the operations 131A-181A are applied on each one of the field values input, e.g., 101A and 102A, to obtain two modified field values Z1A(Field 101A) and Z1A(Field 102A). In other implementations, a different subset of these operations can be performed on each of the field values. In some implementations, the determination of which one of the string modifier is used can depend on the field type (full name, first name or last name) For example, field value 102A, Johnny, may not be subject to an operation of the title remover 181, the salutation remover 161A, the special character remover 141A, or the accent remover 151A. Similarly, the field value 101A Dr. J. W. Green may not be subject to an operation of the title remover 181A, the accent remover 151A, or the double letter remover 171A. The string modifier 121A can be considered as a first blurring operator Z1A that receives a field value as input (e.g., field value 101A and field value 102A) and modifies the field value based on one or more of the operations described above to obtain the modified field values (e.g., Z1A(Field 101A) and Z1A(Field 102A)). The modified field values can be used as inputs to one or more other blurring operators as per (2)-(4) or during a training phase or prediction phase of the field matcher 100.

The PNBO 110A includes a phonetic key extractor 122A (Z2A), a letter permuter 123A (Z3A), a consonant/vowel extractor 124A (Z4A), and an optional letter permuter 125D (Z5A). The phonetic key extractor 122A receives a modified field value $z_1$ and extracts its phonetic key resulting in the modified field value $Z2A(z_1)$. In some implementations, Soundex can be used to determine the phonetic key of a field value. Other phonetic key transformation algorithm can be used without departing from the scope of the present inventive concept.

The letter permuter 123A (Z3A) receives the modified field value $z_1$ and modifies the order of the letters in the input string such that the letters are ordered in an alphabetical order as opposed to the original order in which they appear in the name. For example, Johny is modified to become hjony by the letter permuter 123A.

The consonant/vowel extractor 124A (Z4A) receives the modified field value $z_1$ and reduces all vowels to V and all consonants to C. For example, johny is modified to become CVCCC. The PNBO 110A may further include an additional order determiner 125D or use the letter permuter 123A to receives as input the output Z3 the consonant/vowel extractor 124A and outputs an ordered vowels and consonant strings. For example, CVCCC is modified to obtain CCCCV. In some implementations, the PNBO includes a letter permuter 125D that is separate from the letter permuter 123A. Alternatively a single letter permuter 125D is used.

Table 1 below illustrates some examples of the application of the blurring operators to multiple values of type full name

TABLE 1

| Exemplary names and their 5 modified versions | | | |
|---|---|---|---|
| u | Dr John | J. W. Green | Johnny |
| $Z1(u) = z_1$ | john | j w green | johny |
| $Z2(z_1) = z_2$ | j500 | j265 | j500 |
| $Z3(z_1) = z_3$ | CVCC | C C CCVVC | CVCCC |
| $Z4(z_1) = z_4$ | hjon | eegjnrw | hjony |
| $Z5(z_3) = z_5$ | CCCV | C C CCCVV | CCCCV |

The modified field values output from the operators 122A, 123A, 124A, or 125A can be further input to a modified values pairing operator 126A. The modified values pairing operator 126A is operative to output from a set of modified values pairs of modified values that are referred to as blurred values of the inputs field value 101A and field value 102A. The pairs can be a combination of two modified values from the set of modified values generated by the application of the multiple operators Z1-Z5 onto the two field values 101A and 102A. For example, for a first field value 101A and a second field value 102A pairing up the individual modified field values of 101A and 102A gives up to 5 distinct blurred values (i.e., pairs of modified field values).

The PNBO 110A further includes a blurring operator(s) 129A that includes a string aligner 127A and the common character determiner 128A. The operator(s) 129A receives two modified field values Z1A(Field 102A) and Z1A(Field 101A) and outputs one or two modified field values Z6A (Z1A(Field 102A), Z1A(Field 101A)) and Z7A(Z1A(Field 102A),Z1A(Field 101A)). As opposed to the operators Z1A-Z5A discussed above that are applied to a field value or to a modified field value, the operator(s) 129A are applied to a pair of field values and outputs modified field values that are based on the relationship between the two paired field values. The operator(s) 129A assist in capturing information on which parts of a first field value and a second field value match and what don't. The blurring operators 129A start from a matched pair (101A, 102A) and generates a blurred values based on the pair. The operator(s) 129A include a string aligner 127A that aligns two field values together. The common character determiner 128A determines the number of letters that are common to the two aligned field values. In one implementations, the common character determiner 128A may replace the common letter with that number and generated a blurred value for the pair of field values. For example, jwgreen and johny in the illustrated example have only one common letter at the start of the strings and the blurred value resulting is 1_wgreen and 1_ohny, where the common letter is replaced with the number 1 and the remaining letters (which differ) are kept in each one of the modified field values. In another implementations, the common character determiner 128 may replace the common letters with a symbol indicating that some letters are common (here the symbol + is used for illustrative purposes only and other symbols can be used). This blurring includes the indication that the names share some common letters without providing the exact number of shared letters. For example, in FIG. 1B, the first letter that is common to both field values is replaced with + such that the modified field values respectively become +_wgreen and +_ohny and the blurred value is (+_wgreen,+_ohny).

TABLE 2 illustrates some name pairs, and the blurred values resulting from the operator(s) 129A. The bolded parts are common to u and v; the italicized ones unique.

| u | john | andy | christie |
|---|---|---|---|
| v | johnny | andrew | kristy |
| $z_6$ | 4 | 3_y | ch_3_tie |
|  | 4_ny | 3_rew | k_3_tie |
| $z_7$ | + | +_y | ch_+_tie |
|  | +_ny | +_rew | k_+_tie |

Each one of the blurred values that are output from the PNBO 110A can be used for determining an augmented training data set 140. The blurred values can also be input to the statistical classifier during the prediction phase for predicting a class for the input field values 101A and 102A. Each one of the different blurring operators included in the PNBO 110A assist in the classification of a pair of field values as a matching pair or not. For example, the modified values obtained with the letter permuter 123A are invariant to transposition errors that can occur in a name allowing to detect a match even when there is a transposition error in the names. The consonant/vowel extractor 124A can be used to detect mismatches. From a reasonable training set, by using consonant/vowel extractor 124A pairs of $z_3$'s with differing values can be used to predict a mismatch of input field values with high confidence. As it will be described in further details below, the statistical classifier leverages the consonant/vowel extractor 124A as it zooms in on the blurred value that is the most predictive. A similar reasoning can be applied to the detection of mismatches with the use of the letter permuter 125D.

Blurring Operation(s) for Field Values of Type Postal Code:

In some implementations, the field values to be matched are of type postal code. For example, the field values can be values of US postal codes. While the implementations herein will be described with respect to US postal codes, similar mechanisms can be used for postal codes of other countries without departing from the scope of the inventive concept. In some implementations, a postal code can include only 5 digits, while in other implementations the postal code can include 9 digits. In some implementations, the desired behavior of the field matcher 100 can include determining the following classification for the example below of table 3:

| Postal Code Value 1 | Postal Code Value 2 | Desired Outcome | Notes |
|---|---|---|---|
| 94123 | 94120 | Match | The two last digits of the input values can be different |
| 84123 | 94345 | Not Match | Initial portion of the value cannot be different |
| 84123 | 84123-4567 | Match | The last 4 digits of the 9-digits value can be ignored |
| 84123-1234 | 84123-4567 | Match | The first 5 digitals of the 9-digits value is identical |
| 84123 | 84213 | Match | Transposition Error can be tolerated |

Table 3 illustrates pairs of US postal codes, postal code value 1 and postal code value 2, labeled with the desired match outcome (match or not match).

Table 3 further includes some notes that can be made with respect to the desired behavior of the field matcher 100 in order to determine whether two values of a field of type postal code match or not.

Figure 1C:
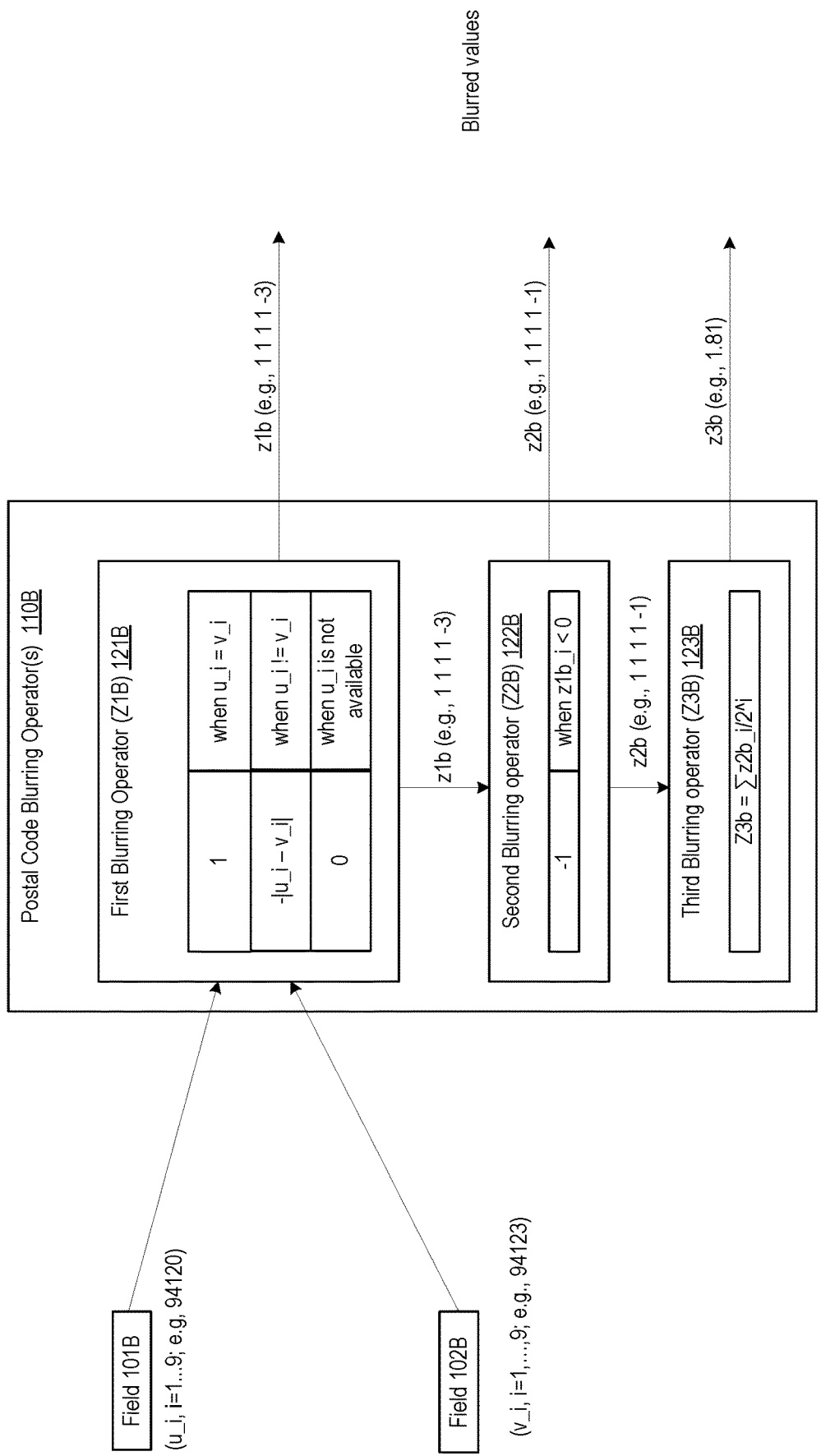
FIG. 1C is a more detailed block diagram illustrating a postal code blurring operator according to some example implementations.
Figure 1D:
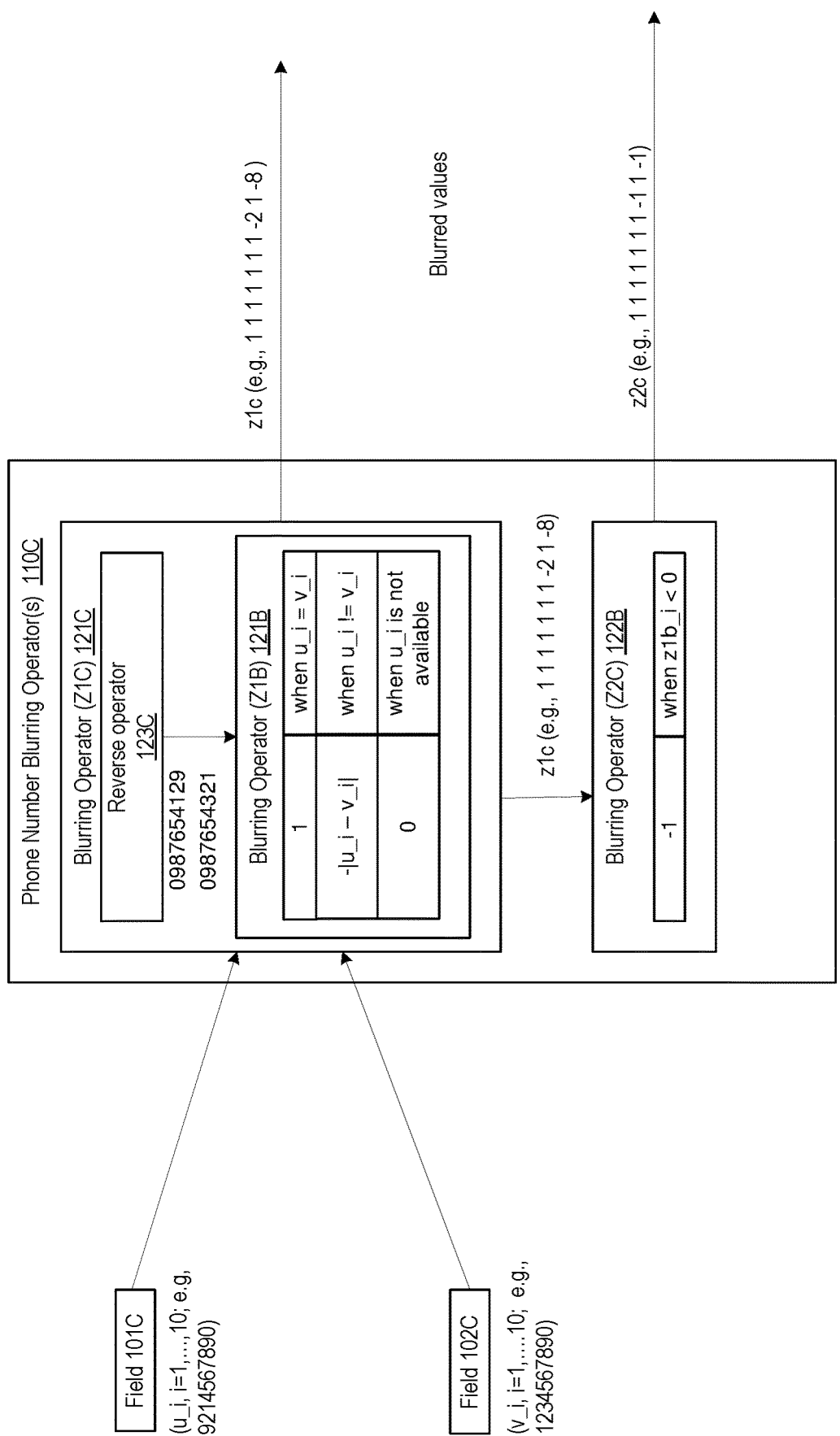
FIG. 1D is a more detailed block diagram illustrating a phone number blurring operator according to some example implementations.
Figure 1E:
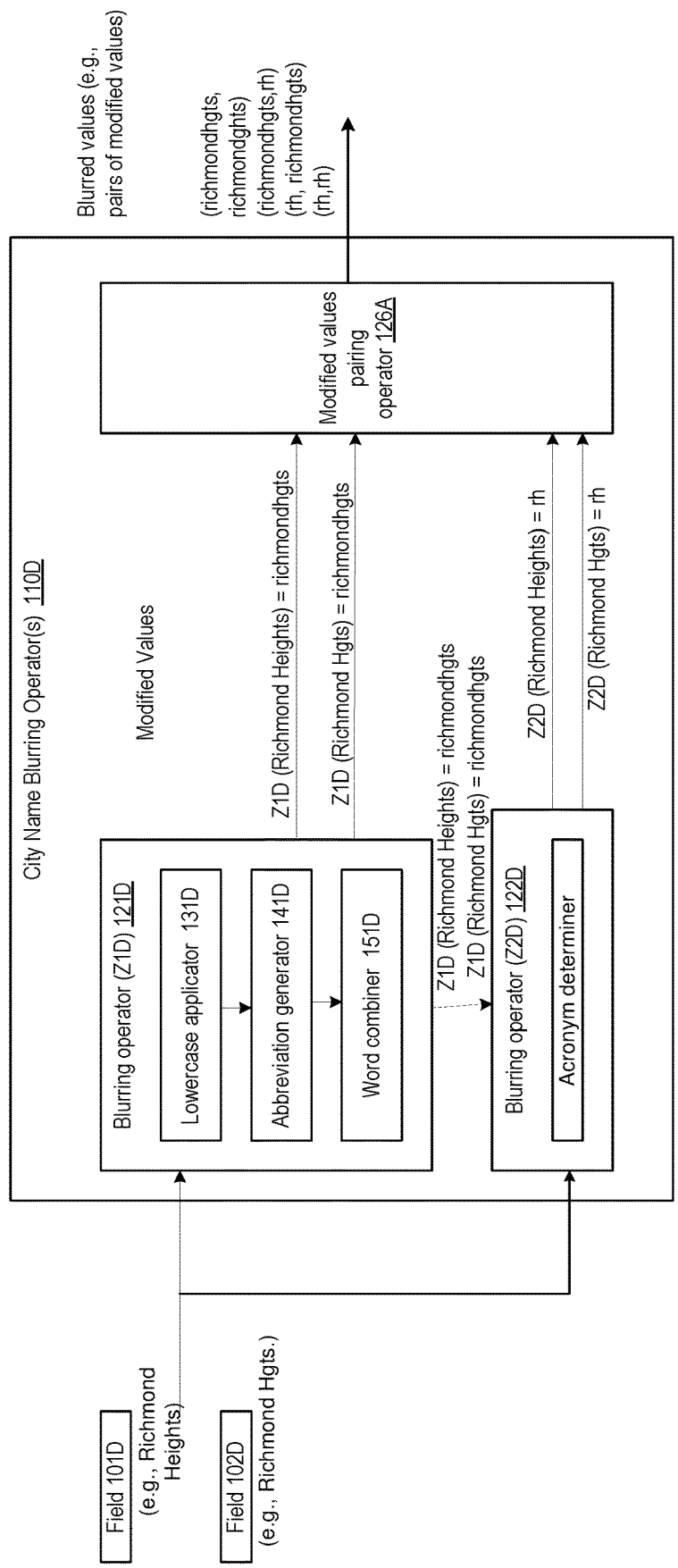
FIG. 1E is a more detailed block diagram illustrating a city name blurring operator according to some example implementations.

FIG. 1C is a more detailed block diagram illustrating a postal code blurring operator according to some example implementations. FIG. 1C and the operations below will be described with reference to second fields from the fields of records 101 and 102. The first field value 101B is referred to as u and is formed of successive digits $u_i$ for i={1, ..., 9}. The second field value 102B is referred to as v and is formed by successive digits $v_i$ for i={1, ..., 9}. The postal code blurring operator(s) (PCBO) 110B is operative to generate from the input field values u and v blurred values. Without loss of generality u and v are ordered such that $|u| \le |v|$. The postal code blurring operator(s) 110B includes a first blurring operator 121B, a second blurring operator 122B, and a third blurring operator 123B.

The first blurring operator 121B (Z1B) produces z1b from (u, v), by performing the following:

$z1b_i = 1$ when $u_i = v_i$, $z1b_i = -|u_i - v_i|$ when $u_i \ne v_i$, and $z1b_i = 0$ when $u_i$ is missing and $v_i$ is present. (6)

The second blurring operator 122B (Z2B) produces from z1b a second blurred value z2b. The second blurring operator 122B replaces each negative value in z1b with −1. The third blurring operator 123B (Z3B) is applied on z2b to obtain the blurred value z3v. The output of the third blurring operator 123B is a number determined based on an operation on the digits of z2b. The third blurred value z3b is representative of a numeric score of how well the two input field values (e.g., postal codes 94120 and postal code 94123) match. In some implementations, the numeric score is determined based on the equation below:

$z_3 = \Sigma_{i=0}^{n} z2b_i / 2^i$ (7)

The observation made above with respect to the different sections of the digits of a postal code, that matches or mismatches in prefix positions are more significant than those in suffix positions is captured in equation (7). In fact more weight is given to the first prefix digits of the postal codes and this weight decreases exponentially as the digits of the field values move to the right. In addition this allows for capturing the notion that some field values that are to be compared may not be of the same length, however, in all cases valid field values should include at least the first 5 leftmost digits.

FIG. 1C illustrates an example where a first field value 94120 and a second field value 94123 are input to the postal code blurring operator 110B. The values are then processed by the first blurring operator to obtain a first blurred value z1b=1 1 1 1−3. This first blurred value is output and transmitted to the second blurring operator 122B to be processed. The second blurring operator 122B generates a second blurred value z2b (1 1 1 1−1) from z1b. The second blurred value z2b is output and transmitted to the third blurring operator 123B to obtain a third blurred value z3b (1.81) based on equation (7).

Table 5 below illustrates additional examples of pairs of field values (u, v) that are input into the postal code blurring operator(s) 110B to obtain three types of blurred values z1b, z2b, and z3b.

TABLE 4

Pairs of field values of type postal code and their respective blurred values.

| u | 9 4 1 2 0 | 8 4 1 2 3 | 8 4 1 2 3 | 8 4 1 2 3 - 1 2 3 4 |
|---|---|---|---|---|
| v | 9 4 1 2 3 | 9 4 3 4 5 | 8 4 1 2 3 - 4 5 6 7 | 8 4 1 2 3 - 4 5 6 7 |
| z1b$_\square$ | 1 1 1 1 -3 | -1 1 -2 -2 -2 | 1 1 1 1 1 - 0 0 0 0 1 1 1 1 1 | - -3 -3 -3 -3 |
| z2b$_\square$ | 1 1 1 1 -1 | 1 1 -1 -1 -1 | 1 1 1 1 1 - 0 0 0 0 1 1 1 1 1 | - -1 -1 -1 -1 |
| z3b$_\square$ | 1.81 | 1.06 | 1.937 | 1.879 |

The blurring operator(s) 110B selected for blurring field values of type postal code allow the generation of blurred values from the field values 101B and 102B. Each one of the blurred values (z1b, z2b, and z3b) that are output from the PCBO 110B can be used for determining an augmented training data set 140. The blurred values can also be input to the statistical classifier during the prediction phase for predicting a class for the input field values 101B and 102B. Each one of the different blurring operators included in the PCBO 110B allows to assist in the classification of a pair of field values as matching or not. The blurring operator(s) allow both the augmented training data set as well as the data used during the prediction to perform the matching classification with the following characteristics: 1) the original instances (original field values) do not need to be used, i.e., the original instances can be discarded; 2) the positions of the mismatched digits matter (i.e., the position of pairs of digits that do not match needs to be taken into consideration); 3) the position of the unmatched digits matters (i.e., the position of digits that do not have a corresponding digit in the other field value needs to be taken into consideration).

In order to simplify the classification model used in the statistical classifier 120 and avoid over-fitting issues, the original instances of the field values of type postal code are discarded in favor of blurred value (e.g., z1b and z2b) that indicate the position of the matches, mismatches or unmatched values. In addition, the third blurring operator 123B allows to build a blurred value that provides more weight to values that match in the early positions (leftmost positions) of the postal code field values as opposed to the values in the later positions (rightmost positions). The blurred values resulting from the third blurring operator 123B put emphasis on the digits in the earlier part of the postal code field values that are a stronger predictor of "not match" than the digits in the later parts of the postal code field values.

Blurring Operation(s) for Field Values of Type Phone Number:

In some implementations, the field values to be matched are of type phone number. For example, the field values can be values of US phone numbers. While the implementations herein will be described with respect to US phone number, similar mechanisms can be used for phone numbers of other countries without departing from the scope of the present inventive concept. In the implementations described herein two field values of type phone number in a same country are to be compared. Without loss of any generality, the phone numbers are processed without the international code that is representative of the country. In some implementations, when the phone numbers include the international code, this code may be removed prior to the phone numbers being input to the phone number blurring operator(s) 110C.

The phone number blurring operator(s) (PBO) 110C is operative to receive a first field value 101C and a second field value 102C and generate, from the field values, blurred values z1c and z2c. The PBO 110C includes a blurring operator 121C that receives the first field value 101C and the second field value 102C and outputs a first blurred value z1c. The blurring operator 121C includes a reverse operator 123C and a blurring operator 121B.

The first field value 101C is referred to as u and is formed of successive digits $u_i$ for i={1, . . . , 10}. The second field value 102C is referred to as v and is formed by successive digits $v_i$ for i={1, . . . , 10}. The reverse operator 123C reverses the order of the digits of a field value of type phone number such that the digit at position 1 in the input field value is put at position 10 in the reversed field value, the digit at position 2 is put at position 9, the digit at position 3 is put at position 8, the digit at position 4 is put at position 7, the digit at position 5 is put at position 6, the digit at position 6 is put at position 5, the digit at position 7 is put at position 3, and the digit at position 8 is put at position 2, and the digit at position 9 is put at the first position of the reversed field value. For example, the field value 101C 9214567890 is reversed to obtain 0987654129 and the field value 102C 1234567890 is reversed to obtain 0987654321.

The reversed field values are fed to the blurring operator 121B. The field operator 121B perform the operations discussed above with reference to FIG. 1C. The blurring operator 121B (Z1B) produces z1c from (u, v), when each one of u and v are phone numbers, by performing the following:

$z_i c_i = 1$ when $u_i = v_i$, $z1c_i = -|u_i - v_i|$ when $u_i \neq v_i$, and $z1c_i = 0$ when $u_1$ is missing and $v_i$ is present. (8)

The obtained blurred value z1c is output and transmitted to the second blurring operator 122B. For example, the blurred value z1c obtained for the first field value 101C and the second field value 102C is 1 1 1 1 1 1 1−2 1−8. The second blurring operator 122B (Z2B) produces from z1c a second blurred value z2c. The second blurring operator 122B replaces each negative value in z1c with −1. The blurred value z2c is output. For example, the resulting blurred value z2c from input fields 101C and 102C is 1 1 1 1 1 1 1−1 1−1.

Table 6 below illustrates additional examples of pairs of field values (u, v) that are input into the phone number blurring operator(s) 110C to obtain three types of blurred values z1b, z2b, and z3b.

TABLE 5

Pairs of field values of type phone number and their respective blurred values.

| u | 4 5 6 7 8 9 0 | 9 2 1 4 5 6 7 8 9 0 |
|---|---|---|
| v | 1 2 3 4 5 6 7 8 9 0 | 1 2 3 4 5 6 7 8 9 0 |
| $u_r$ | 0 9 8 7 6 5 4 | 0 9 8 7 6 5 4 1 2 9 |
| $v_r$ | 0 9 8 7 6 5 4 3 2 1 | 0 9 8 7 6 5 4 3 2 1 |

TABLE 5-continued

Pairs of field values of type phone number
and their respective blurred values.

| | | |
|---|---|---|
| $z_1$ | 1 1 1 1 1 1 0 0 0 | 1 1 1 1 1 1 1 -2 0 -8 |
| $z_2$ | 1 1 1 1 1 1 0 0 0 | 1 1 1 1 1 1 1 -1 0 -1 |

The blurring operator(s) 110C selected for blurring field values of type phone numbers allow the generation of blurred values from the field values 101C and 102C. Each one of the blurred values (z1c and z2c) that are output from the PBO 110C can be used for determining an augmented training data set 140. The blurred values can also be input to the statistical classifier during the prediction phase for predicting a class for the input field values 101C and 102C. Each one of the different blurring operators included in the PBO 110C assist in the classification of a pair of field values as matching or not. The blurring operator(s) allow both the augmented training data set as well as the data used during the prediction to perform the matching classification with the following characteristics: 1) matches or mismatches on earlier positions are more significant than matches or mismatches on later positions; 2) the digits in the region code (area code for US) may be missing in one of the numbers.

In order to simplify the classification model used in the statistical classifier 120 and avoid over-fitting issues, the original instances of the field values of type phone number are discarded in favor of blurred value (e.g., z1c and z2c) that indicate the position of the matches, mismatches or unmatched values.

Blurring Operation(s) for Field Values of Type City Name:

In some implementations, the field values to be matched are of type city name. For example, the field values can be values of US city names. While the implementations herein will be described with respect to US city names, similar mechanisms can be used for city names of other countries without departing from the scope of the present inventive concept.

The city name blurring operator(s) (CNBO) 110D is operative to receive a first field value 101D and a second field value 102D and generate blurred values from the field values. The blurred values include pairs of modified values such as z1d and z2d. The CNBO 110D includes a blurring operator 121D and a blurring operator 122D.

The blurring operator 121D includes a lowercase applicator 131D, an abbreviation generator 141D, and a word combiner 151D. The lowercase applicator 131D transforms each received field value (e.g., Richmond Heights) into a lowercase string (e.g., richmond heights). The abbreviation generator 141D replaces directional qualifiers (such as east, west, etc.) by their respective abbreviations (e.g., east is replaced with e, west is replaced with w, etc.). The abbreviation generator 141D may further replace certain terms by their abbreviations (e.g. heights by hgts, street by st, boulevard by blvd). The blurring operator 121D further includes a word combiner 151D that is operative to fuse the words forming the city name field. The word combiner 151D drops space separating adjacent words and outputs a single string. The blurring operator 121D receives a first field value 101D and a second field value 102D, e.g., Richmond Heights and Richmond Hgts, and applies each one the operations of 131D, 141D, and 151D on the field values resulting in two modified values Z1D(Richmond Heights)=richmondhgts and Z1D(Richmond Hgts)=richmondhgts.

The blurring operator 122D, denoted Z2D, derives an acronym from a multi-word city name. The acronym can be derived from the modified values or alternatively from the input field values 101D and 102D.

Table 9 illustrates exemplary city names with their respective modified values.

TABLE 6

Exemplary city names and their corresponding blurred versions.

| u | south san francisco | New York City | Richmond Heights |
|---|---|---|---|
| z1d | ssanfrancisco | newyorkcity | richmondhgts |
| z2d | ssf | nyc | rh |

The modified values are fed to a modified values pairing operator 126A that outputs blurred values for the field values. The blurred values includes pairs of modified values.

The blurring operator(s) 110D selected for blurring field values of type city names allow the generation of blurred values from the field values 101D and 102D. Each one of the blurred values that are output from the CNBO 110D can be used for determining an augmented training data set 140. The blurred values can also be input to the statistical classifier 120 during the prediction phase for predicting a class for the input field values 101D and 102D. Each one of the different blurring operators included in the CNBO 110D assist in the classification of a pair of field values as matching or not.

Blurring Operation(s) for Field Values of Type Street Address:

In some implementations, the field values to be matched are of type street address. For example, the field values can be values of US street address. While the implementations herein will be described with respect to US street addresses, similar mechanisms can be used for street addresses of other countries without departing from the scope of the present inventive concept.

Figure 1F:
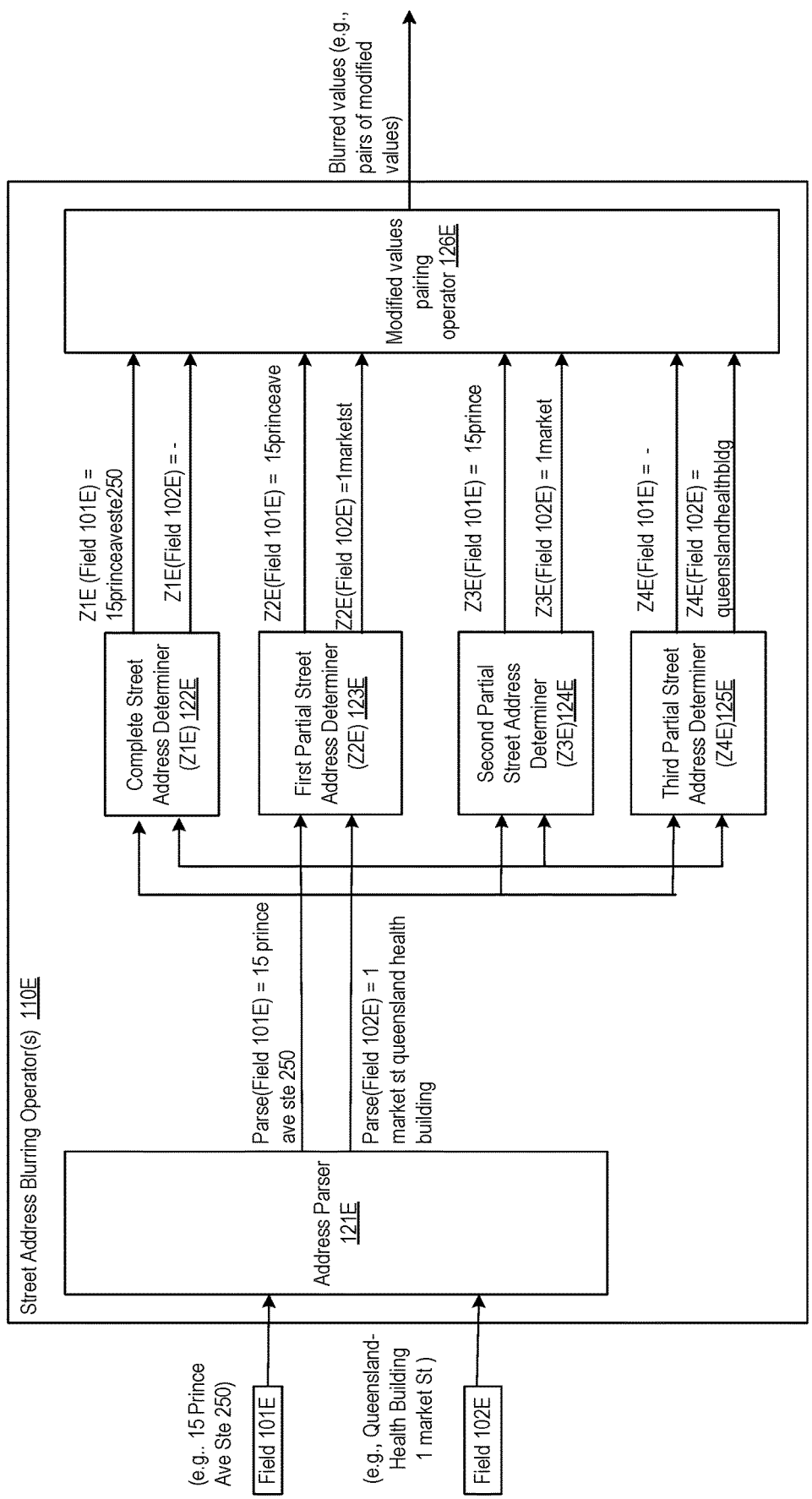
FIG. 1F is a more detailed block diagram illustrating a street address blurring operator according to some example implementations.

FIG. 1F is a more detailed block diagram illustrating a street address blurring operator according to some example implementations. The street address blurring operator(s) (SABO) 110E is operative to receive a first field value 101E and a second field value 102E and generate blurred values from the field values. The blurred values include pairs of modified values such as z1e, z2e, z3e, and z4e. The SABO 110E includes an address parser 121E, a complete street address determiner 122E, a first partial street address determiner 123E, a second partial street address determiner 124E, a third partial street address determiner 125E. The address parser 121E is operative to receive field values 101E and 102E and generate parsed street addresses. The parsed street addresses are such that components of the street address are identified (e.g., street number, street name, street suffix word (st, ave, blvd, . . . ), unit name (suite, apt, floor, . . . ), unit number (ste number, apt number, . . . ), building name, and building suffix word (house, hospital, . . . ), etc.).

The parsed values of the field values 101E and 102E are fed into each one of the complete street address determiner 122E, the first partial street address determiner 123E, the second partial street address determiner 124E, and the third partial street address determiner 125E. The complete street address determiner 122E outputs a modified value of the field based on operation Z1E. The first partial street address determiner 123E outputs a modified value of the field value based on operation Z2E. The second partial street address determiner 124E outputs a modified values of the field value based on operation Z3E. The third partial street address determiner 125E outputs a modified value based on the operation Z4E. The operations Z1E, Z2E, Z3E, and Z4E are defined herein below:

> Z1E=street number+street name+street suffix word+ unit name+unit number
>
> Z2E=street number+street name+street suffix word
>
> ZE3=street number+street name
>
> Z4E=building name+building suffix word Each one of the operations is applied to the parsed field value. When the parsed field value does not include one of the components used in a respective operation, the output of the operation is undefined. For example, when the complete street address determiner 122E receives the second field value 102E (Queensland Health Building 1 market St) and a determination is made that the input field value does not include a unit name or a unit number, which are needed for the operator Z1E, the output of Z1E is undefined (no output).

Classification of a Pair of Values of a Field Type

Figure 1G:
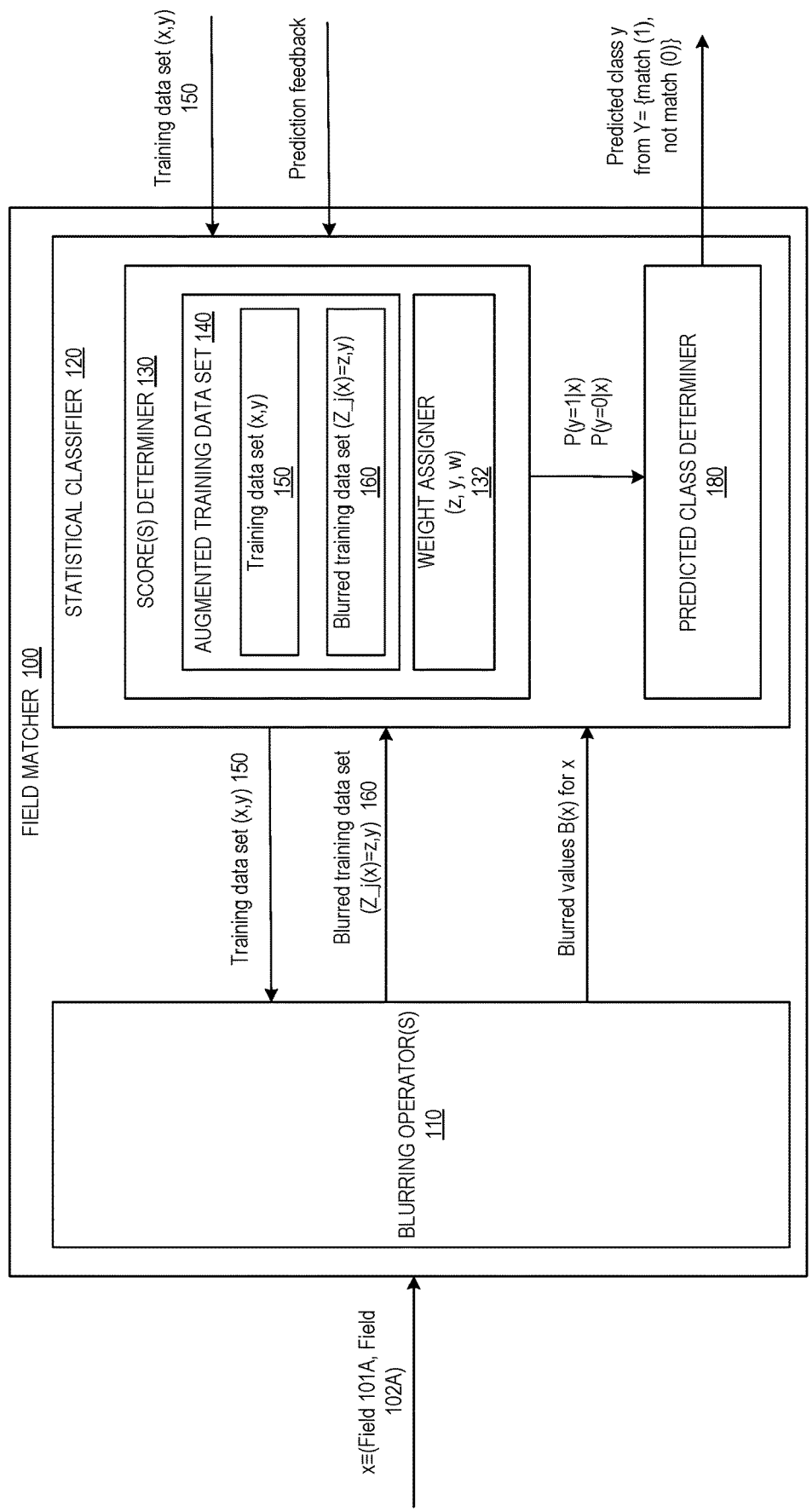
FIG. 1G illustrates a block diagram of a statistical classifier according to some example implementations.

FIG. 1G illustrates a block diagram of a statistical classifier according to some example implementations. The field matcher 100 includes a statistical classifier 120. The statistical classifier 120 can operate in two different phases. A first phase of operation that is a training phase and a second phase of operation that is a prediction phase.

During the training phase, the statistical classifier receives a training data set 150. The training data set 150 includes multiple labeled instances (x, y), where x is a pair of field values (u, v) of a field type and y is a known class for the pair field values. For example, a labeled instance represents a known pair of matching field values such as (Richmond heights, richmond hgts) and their associated class (1) indicating that the two values match. Several instances of different field types are included in the training data set 150.

From the labeled instances (x, y), blurred training data set 160 is generated by applying the blurring operations of blurring operator(s) 110 to the input value x to obtain one or more blurred values z. The blurred training data set 160 includes multiple labeled instances (z, y)—one for each blurring z of x. Given that each input field value x may have several blurring operations defined, for each labeled instance (x, y) one or multiple labeled (z, y) can be obtained depending on the blurring operations defined for the field type to which the field values of x belong. In some implementations, each labeled instance (z, y) is obtained by applying operations of one of the blurring operator(s) 110A-E as described with reference to FIGS. 1B-F. A classification model is then generated at the statistical classifier based on the augmented training data set 140 that includes the training data set 150 and the blurred training data set 160. The use of the blurred training data set 160 in addition to the training data set 150 allows to learn which blurring operations better predict the class. The blurring operations that strongly predict the class for an input x enable the statistical classifier 120 to generalize from the augmented training set 140 and to predict a class y for a new input.

In some implementations, each labeled instance (z, x) from the blurred training data set 160 is associated with a weight. When the labeled instance (z, x) result from the application of an identity blurring operator, then (z, y) is assigned the highest weight. In some implementations, a labeled instance resulting from the identity blurring operator can be the original labeled instance (x, y). The weight w assigned to a labeled instance including a blurred value depends on the type of blurring operation that resulted in the blurred value and the amount of information lost when transforming x into z. In some implementations, the more blurred z is relative to x the lower the weight of its instance (z, y) is. The weight assigned to each labeled instance (z, y) of the blurred training data set 160 can be used during the cost determination in the prediction phase of the statistical classifier. In some implementations, the weights are positive integers. A weighted blurred instance (z, y, w) can be represented in the augmented training set 140 by multiple unweighted instances (z, y) appearing w times in the augmented training set 140.

The weighting mechanism causes the statistical classifier 120 to favor trusting a class on an input that appears in the original training data set 150 over trusting a class of a blurred version that is added as part of the blurred training data set 160. In some implementations, the statistical classifier may favor the blurred instance as opposed to the original instance, when the same original input appears multiple times in the original training set, with different classes. The weighting mechanism allows the statistical classifier 120 to predict a class for an input with the assumption that coarser blurring operations—which cause the blurred value to lose more of the details of the input x—are less likely to preserve x's class than finer blurring operations.

Once the augmented training set 140 is determined, the classification model is generated by estimating the various quantities P(y|z) for the multiple values of y and the multiple values of z, where P(y|z) is the probability that the class be y when z is the blurred value. This is performed based on the augmented training data set 140.

In some implementations, the field matcher 100 may receive prediction feedback that can further be used to update the classification model during subsequent training phases. In these implementations, the classification model can be continuously updated upon receipt of the feedback regarding past predictions.

During a second phase, i.e., the prediction phase, the statistical classifier 120 is operative to receive blurred values from the blurring operator(s) 110 and predict a predicted class y for an input x (including two field values of a given field type) based on the blurred values. The statistical classifier 120 identifies to which of a set of categories/classes from the set Y a new observation x belongs. Unlike standard statistical classifiers, the statistical classifier 120 does not use features associated with the input to make a prediction for that input. Instead, the statistical classifier 120 uses blurred values generated from the input x. Statistical classifier 120 is operative to receive blurred values for different field types and is operative to make a prediction for inputs of different field types. Thus, in the implementations described herein, the same statistical classifier is used for inputs of multiple field types.

The statistical classifier 120 includes a score(s) determiner 130 and a predicted class determiner 180. The scores determiner 130 is operative to determine one or more scores based on the blurred values of an input x and the classification model determined during the training phase. The score(s) determiner 130 determines the scores based on an augmented training set of data 140.

The determination of the scores is described herein with respect to an input x=(u, v) including two field values u and v. The field values u and v are of the same field type. The field matcher 110 is to determine for the pair of field values whether the field values match or not by predicting a class y for the input x. The input x is input in the blurring operator(s) 110 and a set of blurred values B (x) is output. The set of blurred values B(x) is determined based on the type of the field values.

The score determiner 130 determines first scores P(y=1|z) for blurred values {z} of the first set of blurred values B(x). Each one of the first scores is indicative of a confidence that a match of the first value and the second value occurs with knowledge of a respective first blurred value from the first set of blurred values. Each one of the first scores can be determined as a probability that y=1 (indicating that first field value matches the second field value) occurs when the blurred value of the input x is z. This score is determined for each blurred value z from the set of blurred values B(x). The score determiner 130 determines a first maximum score that is greater than or equal to other scores of the first scores. The first maximum score P(y=1|x) =$\max_{z \in B(x)} P(y|z)$ is the greater score over all of the blurred values z of x in B(x) for y=1.

The score determiner 130 determines second scores P(y=0|z) for blurred values {z} of the first set of blurred values B(x). Each one of the second scores is indicative of a confidence that a match of the first value and the second value does not occur with knowledge of a respective first blurred value from the first set of blurred values. Each one of the second scores can be determined as a probability that y=0 (indicating that first field value does not match the second field value) occurs when the blurred value of the input x is z. This score is determined for each blurred value z from the set of blurred values B(x). The score determiner 130 determines a second maximum score that is greater than or equal to other scores of the second scores. The second maximum score P(y=0|x)=$\max_{z \in B(x)} P(y|z)$ is the greater score over all of the blurred values z of x in B(x) for y=0.

The scores are fed to the predicted class determiner 180. The predicted class determiner 180 determines which one of the first maximum score and the second maximum is the greater and based on this determination outputs the predicted class y that corresponds to the greater maximum score. In other words, the predicted class y for the input x is the class that is associated with the highest probability. Thus, responsive to determining that the first maximum score is greater than the second maximum score, the predicted class determiner 180 outputs an indication that the first value matches the second value. The indication that the first value and the second value match is a class y=1. Alternatively, responsive to determining that the first maximum score is smaller than the second maximum score, the predicted class determiner 180 outputs an indication that the first value does not match the second value. The indication that the first value and the second value do not match is a class y=0.

Based on the prediction mechanism described herein, the statistical classifier 120 is operative to generalize the prediction for an input x when the input x does not appear in the augmented training set. In this case, the statistical classifier 120 predicts the class y for the input x from the blurred value that can best predict y. This behavior is reinforced by the prediction function which predicts the class to be the majority class of the most predictive blurring of x. Generally, when x appears in the augmented training set, the sharpest prediction will be from x itself.

The operations in the flow diagrams are described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

Figure 2A:
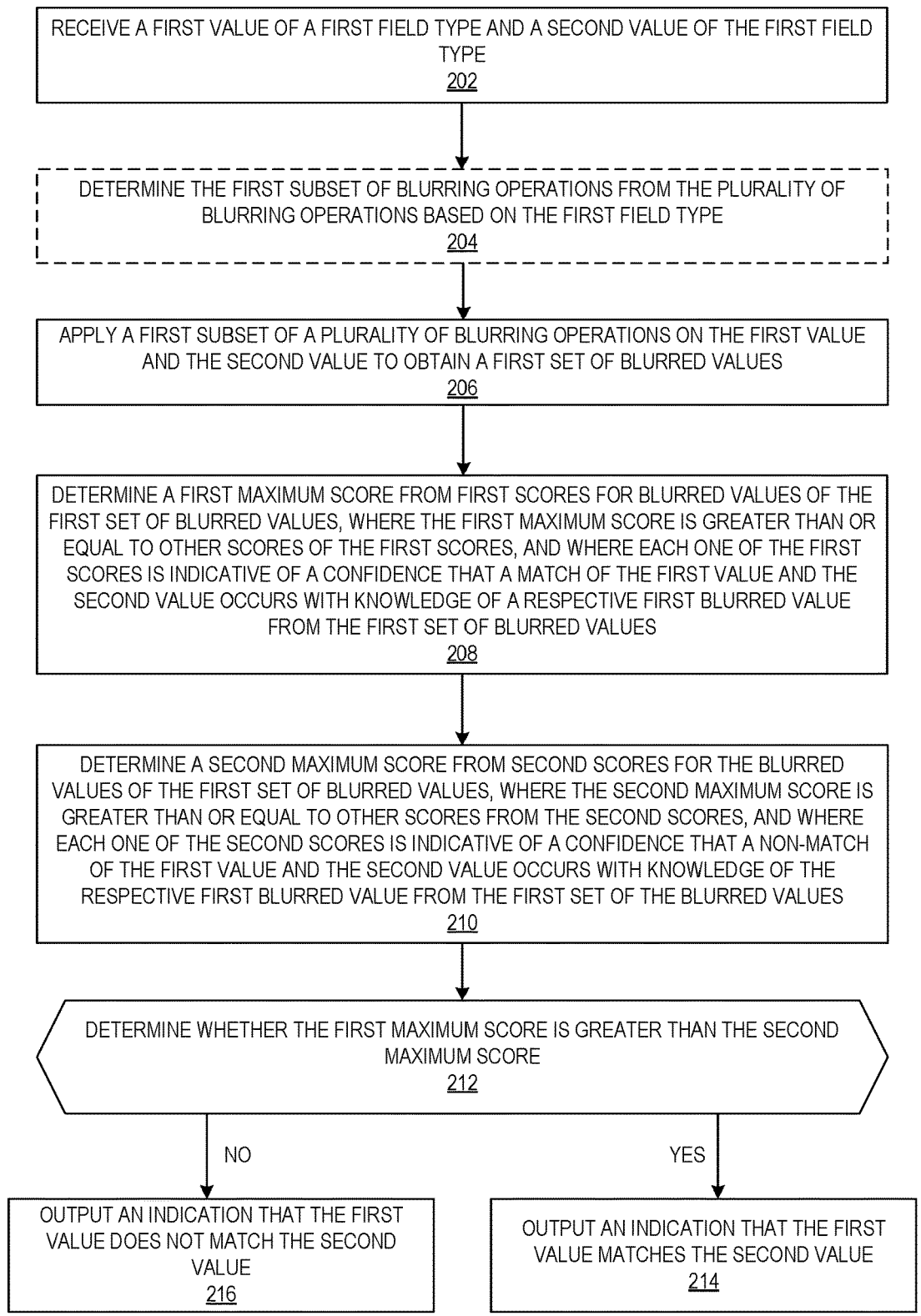
FIG. 2A is a flow diagram illustrating exemplary operations of matching field values of a field type according to some example implementations.

FIG. 2A is a flow diagram illustrating exemplary operations of matching field values of a field type according to some example implementations. In some implementations, the operations of FIG. 2A are performed by a field matcher 100. For example, the operations of FIG. 2A can be performed by a combination of the blurring operator(s) 110 and the statistical classifier 120 during a prediction operation. These operations can be performed to determine whether a first field value and a second field value of a field type match or not. The determination of whether the first field value and the second field value match is performed by determining a predicted class from a set of classes (e.g., y) for an input (e.g., x) that includes the first and the second field values based on a prediction model of the statistical classifier 120.

At operation 202, the field matcher 100 receives a first value (e.g., 101A, 101B, 101C, 101D, or 101E) of a first field type and a second value (e.g., 102A, 102B, 102C, 102D, or 102E) of the first field type. The two field values are of a same field type. The first field type can be any one of a name, a postal code, a street address, a phone number, or a city name.

In some implementations, the flow of operations further includes operation 204, at which the field matcher 100 determines, based on the first field type, the first subset of blurring operations from multiple blurring operations. For example, this operation can be performed by the field blurring operator selector 111 based on the first field type of the field values received. The field blurring operator determines a set of field blurring operators for that field type (e.g., 110A, 110B, 110C, 110D, 110E, or 110F). Thus, in these implementations, the type of blurring operations performed by the blurring operator(s) depends on the field type of the field values to be matched.

For example, when a third value and a fourth value of a second field type that is different from the first field type, are received, a second subset of blurring operations is determined that is different from the first subset of blurring operations. For example, when the first and second values are of field type person name, the PNBO 110A are selected, while when the third and fourth values are of field type phone number, the PBO 110C are selected.

In some implementations, the operation 204 is performed when there are several field types. In other implementations, when a single field type is defined in the system, the operation 204 may be skipped.

The flow of operations then moves to operation 206. At operation 206, the field matcher 100 applies a first subset of blurring operations on the first value and the second value to obtain a first set of blurred values. In some implementations, the blurred values can be pairs of modified values of the first value and the second value or a single blurred value generated from the first value and the second value. FIGS. 1B-F describe several implementations of blurring operations that can be applied on the first and second value. The blurring operations are described with respect to blurring operator(s) 110A-E. Each one of the blurring operator(s) 110A-E is to be applied to field values of a respective type. For example, when first and second value of the first type are input, the blurring operations of the PNBO 110A can be used, while when a third and fourth value of a second type are input, the blurring operations of one of the other operator(s) 110B-E that is different from PNBO 110A is used.

The flow of operations moves to operation 208, at which the field matcher 100 determines a first maximum score from first scores for blurred values of the first set of blurred values. The first maximum score is greater than or equal to other scores of the first scores, and each one of the first scores is indicative of a confidence that a match of the first value and the second value occurs with knowledge of a respective first blurred value from the first set of blurred values.

The flow of operations moves to operation 210, at which the field matcher 110 determines a second maximum score from second scores for the blurred values of the first set of blurred values. The second maximum score is greater than or equal to other scores from the second scores, and each one of the second scores is indicative of a confidence that a non-match of the first value and the second value occurs with knowledge of the respective first blurred value from the first set of the blurred values.

At operation 212, the field matcher determines whether the first maximum score is greater than the second maximum score. Responsive to determining that the first maximum score is greater than the second maximum score, the flow of operations moves to operation 214, at which the field matcher outputs an indication that the first value matches the second value. Alternatively, Responsive to determining that the first maximum score is not greater than the second maximum score, the flow of operations moves to operation 216, at which the field matcher 100 outputs an indication that the first value does not match the second value.

In some implementations, the operations 208-216 are performed as described with reference to FIG. 1G.

FIG. 2B is a flow diagram illustrating exemplary operations of training a field matcher with an augmented training data set according to some example implementations. The operations of FIG. 2B can be performed during an initial training phase of the statistical classifier 120 of the field matcher 100, in which a first classification model is determined based on the augmented training data set. The operations of FIG. 2B can further be performed during a training phase performed after deployment of the classification model and following the receipt of prediction feedback.

At operation 222, the field matcher 100 receives a training data set of values (x, y) 150. Each pair of values includes a first value and a second value of a field type from multiple field types, and each pair of values is associated with a class indicating whether the first value and the second value match. The training data set 150 is the initial training set for pairs of values. The training data set includes pairs of values of multiple field types.

The flow of operations then moves to operations 224-228. For each pair of values and associated class the following operations are performed. At operation 224, a set of one or more blurring operations are applied on the first value and the second value to obtain one or more blurred values. The blurring operations are determined based on the field type of the first and the second value.

The flow of operations moves to operation 226, at which the field matcher 100 determines, based on a blurring level, a weight to be associated with each one of the blurred values. In some implementations, the operation 226 is skipped.

The flow of operations moves to operation 228, at which the field matcher 100 associate the class of the initial pair of values to each one of the generated blurred values. This generates a blurred training data set 160.

At operation 230, the field matcher 100 outputs an augmented training data set 140 including the values and the blurred values with associated classes (e.g., the initial training data set 150 and the blurred training data set 160). The augmented training data set is to be used to train the statistical classifier for matching values of multiple field types.

Exemplary Electronic Devices
Electronic Device and Machine-Readable Media

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 3A:
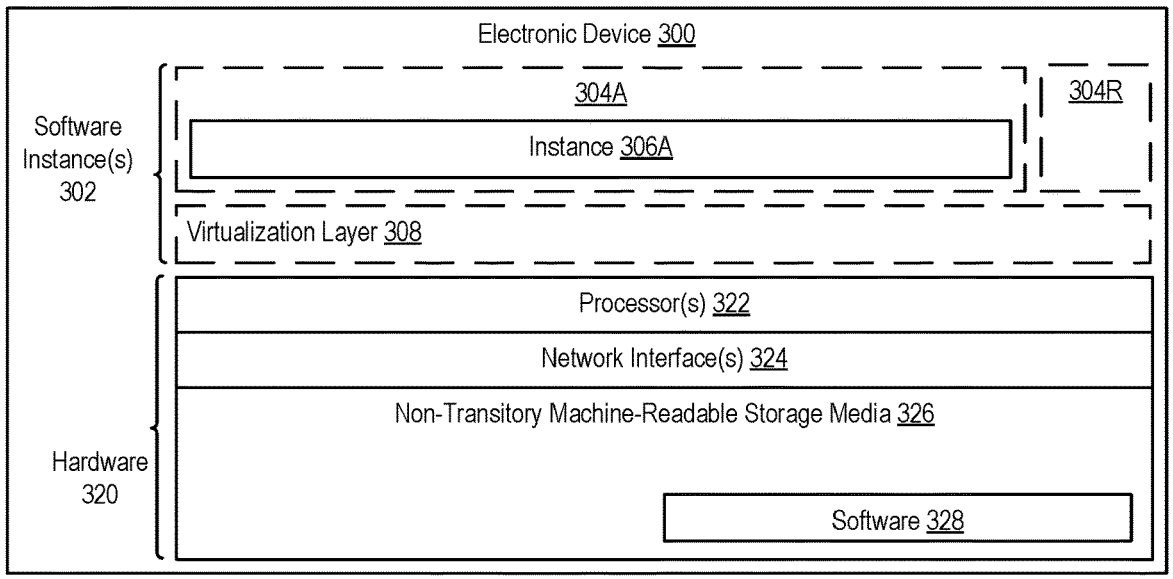
FIG. 3A is a block diagram illustrating an electronic device according to some example implementations.

FIG. 3A is a block diagram illustrating an electronic device 300 according to some example implementations. FIG. 3A includes hardware 320 comprising a set of one or more processor(s) 322, a set of one or more network interfaces 324 (wireless and/or wired), and non-transitory machine-readable storage media 326 having stored therein software 328 (which includes instructions executable by the set of one or more processor(s) 322). Each of the previously described field matcher 100, the blurring operator(s) 110, and the statistical classifier 120 may be implemented in one or more electronic devices 300. In one implementation: 1) each of the blurring operator(s) 110 and the statistical classifier 120 is implemented in a separate one of the electronic devices 3003; 2) the blurring operator(s) 110 and the statistical classifier 120 are implemented in a set of one or more of the electronic devices 3003; and 3) in operation, the electronic devices implementing the blurring operator(s) 110 and the statistical classifier 120 would be communicatively coupled (e.g., by a network) and would establish between them (or through one or more other layers) connections. Other configurations of electronic devices may be used in other implementations (e.g., an implementation in which the blurring operator(s) 110 and the statistical classifier 120 are implemented on a single electronic device 300).

In electronic devices that use compute virtualization, the set of one or more processor(s) 322 typically execute software to instantiate a virtualization layer 308 and software container(s) 304A-R (e.g., with operating system-level virtualization, the virtualization layer 308 represents the kernel of an operating system (or a shim executing on a base operating system) that allows for the creation of multiple software containers 304A-R (representing separate user space instances and also called virtualization engines, virtual private servers, or jails) that may each be used to execute a set of one or more applications; with full virtualization, the virtualization layer 308 represents a hypervisor (sometimes referred to as a virtual machine monitor (VMM)) or a hypervisor executing on top of a host operating system, and the software containers 304A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 328 (illustrated as instance 306A) is executed within the software container 304A on the virtualization layer 308. In electronic devices where compute virtualization is not used, the instance 306A on top of a host operating system is executed on the "bare metal" electronic device 300. The instantiation of the instance 306A, as well as the virtualization layer 308 and software containers 304A-R if implemented, are collectively referred to as software instance(s) 302.

Alternative implementations of an electronic device may have numerous variations from that described above. For example, customized hardware and/or accelerators might also be used in an electronic device.

Databases

Databases may be implemented according to a variety of different database models, such as relational, non-relational, graph, columnar (also known as extensible record; e.g., HBase), object, tabular, tuple store, and multi-model. Examples of non-relational database models (which are also referred to as schema-less and NoSQL) include key-value store and document store (also known as document-oriented as they store document-oriented information, which is also known as semi-structured data).

In some implementations of a cloud database (a database that runs on a cloud platform and that is provided as a database service), identifiers are used instead of database keys, and relationships are used instead of foreign keys. While implementations may use one or more types of databases, a relational database with tables is sometimes described to simplify understanding. In the context of a relational database, each relational database table (which is a type of database object) generally contains one or more data categories logically arranged as columns according to a schema, where the columns of the relational database table are different ones of the fields from the plurality of records, and where each row of the relational database table are different ones of a plurality records and contains an instance of data for each category defined by the fields. Thus, the fields of a record are defined by the structure of the database object to which it belongs. By way of example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields.

Exemplary Environment

Figure 3B:
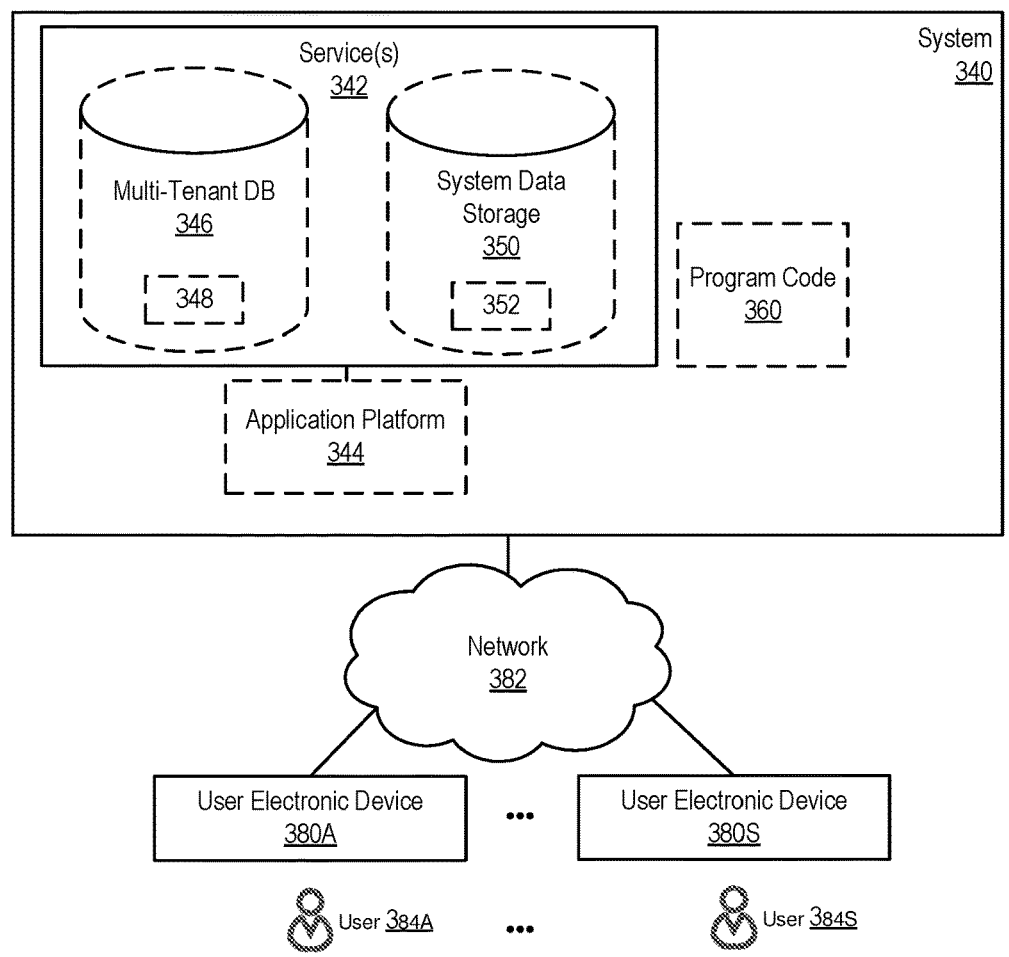
FIG. 3B is a block diagram of an environment where a field matcher may be deployed, according to some implementations.

FIG. 3B is a block diagram of an environment where a field matcher 100 may be deployed, according to some implementations. A system 340 includes hardware (a set of one or more electronic devices) and software to provide service(s) 342, including the field matcher service. The system 340 is coupled to user electronic devices 380A-S over a network 382. The service(s) 342 may be on-demand services that are made available to one or more of the users 384A-S working for one or more other organizations (sometimes referred to as outside users) so that those organizations do not need to necessarily be concerned with building and/or maintaining a system, but instead makes use of the service(s) 342 when needed (e.g., on the demand of the users 384A-S). The service(s) 342 may communication with each other and/or with one or more of the user electronic devices 380A-S via one or more Application Programming Interface(s) (APIs) (e.g., a Representational State Transfer (REST) API). The user electronic devices 380A-S are operated by users 384A-S.

In one implementation, the system 340 is a multi-tenant cloud computing architecture supporting multiple services, such as a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), and/or Infrastructure as a Service (IAAS) (e.g., virtual machines, servers, and/or storage). For example, system 340 may include an application platform 344 that enables PAAS for creating, managing, and executing one or more applications developed by the provider of the application platform 344, users accessing the system 340 via one or more of user electronic devices 380A-S, or third-party application developers accessing the system 340 via one or more of user electronic devices 380A-S.

In some implementations, one or more of the service(s) 342 may utilize one or more multi-tenant databases 346 for tenant data 348, as well as system data storage 350 for system data 352 accessible to system 340. In certain implementations, the system 340 includes a set of one or more servers that are running on server electronic devices and that are configured to handle requests for any authorized user associated with any tenant (there is no server affinity for a user and/or tenant to a specific server). The user electronic device 380A-S communicate with the server(s) of system 340 to request and update tenant-level data and system-level data hosted by system 340, and in response the system 340 (e.g., one or more servers in system 340) automatically may generate one or more Structured Query Language (SQL) statements (e.g., one or more SQL queries) that are designed to access the desired information from the one or more multi-tenant database 346 and/or system data storage 350.

In some implementations, the service(s) 342 are implemented using virtual applications dynamically created at run time responsive to queries from the user electronic devices 380A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 360 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 344 includes an application setup mechanism that supports application developers' creation and management of applications, which may be saved as metadata by save routines. Invocations to such applications, including the XYZ service, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 382 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data between the system 340 and the user electronic devices 380A-S.

Each user electronic device 380A-S(such as a desktop personal computer, workstation, laptop, Personal Digital Assistant (PDA), smart phone, etc.) typically includes one or more user interface devices, such as a keyboard, a mouse, a trackball, a touch pad, a touch screen, a pen or the like, for interacting with a graphical user interface (GUI) provided on a display (e.g., a monitor screen, a liquid crystal display (LCD), etc.) in conjunction with pages, forms, applications and other information provided by system 340. For example, the user interface device can be used to access data and applications hosted by system 340, and to perform searches on stored data, and otherwise allow a user 384 to interact with various GUI pages that may be presented to a user 384. User electronic devices 380A-S might communicate with system 340 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 380A-S might include an HTTP client, commonly referred to as a "browser," for sending and receiving HTTP messages to and from server(s) of system 340, thus allowing users 384 of the user electronic device 380A-S to access, process and view information, pages and applications available to it from system 340 over network 382.

CONCLUSION

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation.

Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are be described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method of matching field values of a field type, the method comprising:
    receiving a first value of a first field type and a second value of the first field type;
    applying a plurality of blurring operations on the first value and the second value to obtain a first set of blurred values;
    determining a first plurality of scores where each score in the first plurality of scores indicates confidence that the first value matches the second value with knowledge of the first set of blurred values;
    determining a first maximum score from the first plurality of scores, where the first maximum score is greater than or equal to other scores of the first plurality of scores;
    determining a second plurality of scores where each score in the second plurality of scores indicates confidence that the first value does not match the second value with knowledge of the first set of blurred values;
    determining a second maximum score from second scores, where the second maximum score is greater than or equal to other scores from the second plurality of scores; and
    responsive to determining that the first maximum score is greater than the second maximum score, outputting an indication that the first value matches the second value.

2. The method of claim 1, wherein the first scores and the second scores are determined based on an augmented training data set including an initial training data set with pairs of values and associated blurred values, and each one of the associated blurred values results from applying one or more of the plurality of blurring operators on a respective pair of values from the training data set.

3. The method of claim 2, wherein each pair of values of the augmented training data set is associated with a class indicating whether the values of the pair match, and wherein each one of the associated blurred values is associated with a same class as the respective pair of values.

4. The method of claim 2, wherein the augmented training data set includes pairs of values of a plurality of field types.

5. The method of claim 2, wherein the first scores and the second scores are further determined based on weights respectively associated with the blurred values, wherein each one of the weights is indicative of a blurring level of the pairs of values.

6. The method of claim 1 further comprising:
    determining, based on the first field type, the plurality of blurring operations from the plurality of blurring operations.

7. The method of claim 6, further comprising:
    receiving a third value of a second field type and a fourth value of the second field type;
    applying additional blurring operations on the third value and the fourth value of the second field type to obtain a second set of blurred values;
    determining a third maximum score from third scores for blurred values of the second set of blurred values, wherein the third maximum score is greater than or equal to other scores of the first scores, and wherein each one of the third scores is indicative of a confidence that a match of the third value and the fourth value occurs with knowledge of a respective second blurred value from the second set of blurred values;
    determining a fourth maximum score from fourth scores for the blurred values of the second set of blurred values, wherein the fourth maximum score is greater than or equal to other scores from the fourth scores, and wherein each one of the fourth scores is indicative of a confidence that a non-match of the third value and the fourth value occurs with knowledge of the respective second blurred value from the second set of the blurred values; and
    responsive to determining that the fourth maximum score is greater than the third maximum score, outputting an indication that the third value does not match the fourth value.

8. The method of claim 7, wherein the second field type is different from the first field type, and the method further comprises:
    determining, based on the second field type, the additional blurring operations from the plurality of blurring operations, wherein the additional blurring operations is different from the plurality of blurring operations.

9. The method of claim 1, wherein the first field type is a name, a postal code, a street address, a phone number, or a city name.

10. A non-transitory machine-readable storage medium that provides instructions that, if executed by a processor for estimating a number of distinct entities in a plurality of records of a database system, will cause said processor to perform operations comprising:
    receiving a first value of a first field type and a second value of the first field type;

applying a plurality of blurring operations on the first value and the second value to obtain a first set of blurred values;

determining a first plurality of scores where each score in the first plurality of scores indicates confidence that the first value matches the second value with knowledge of the first set of blurred values;

determining a first maximum score from the first plurality of scores, where the first maximum score is greater than or equal to other scores of the first plurality of scores;

determining a second plurality of scores where each score in the second plurality of scores indicates confidence that the first value does not match the second value with knowledge of the first set of blurred values;

determining a second maximum score from second scores, where the second maximum score is greater than or equal to other scores from the second plurality of scores; and responsive to determining that the first maximum score is greater than the second maximum score, outputting an indication that the first value matches the second value.

11. The non-transitory machine-readable storage medium of claim 10, wherein the first scores and the second scores are determined based on an augmented training data set including pairs of values and associated blurred values, and each one of the associated blurred values results from applying one or more of the plurality of blurring operators on a respective pair of values from the training data set.

12. The non-transitory machine-readable storage medium of claim 11, wherein each pair of values of the augmented training data set is associated with a class indicating whether the values of the pair match, and wherein each one of the associated blurred values is associated with a same class as the respective pair of values.

13. The non-transitory machine-readable storage medium of claim 11, wherein the augmented training data set includes pairs of values of a plurality of field types.

14. The non-transitory machine-readable storage medium of claim 11, wherein the first scores and the second scores are further determined based on weights respectively associated with the blurred values, wherein each one of the weights is indicative of a blurring level of the pairs of values.

15. The non-transitory machine-readable storage medium of claim 10, wherein the operations further comprise:

determining, based on the first field type, the plurality of blurring operations from the plurality of blurring operations.

16. The non-transitory machine-readable storage medium of claim 15, wherein the operations further comprise:

receiving a third value of the first field type and a fourth value of the first field type;

applying additional blurring operations on the third value and the fourth value of the second field type to obtain a second set of blurred values;

determining a third maximum score from third scores for blurred values of the second set of blurred values, wherein the third maximum score is greater than or equal to other scores of the first scores, and wherein each one of the third scores is indicative of a confidence that a match of the third value and the fourth value occurs with knowledge of a respective second blurred value from the second set of blurred values;

determining a fourth maximum score from fourth scores for the blurred values of the second set of blurred values, wherein the fourth maximum score is greater than or equal to other scores from the fourth scores, and wherein each one of the fourth scores is indicative of a confidence that a non-match of the third value and the fourth value occurs with knowledge of the respective second blurred value from the second set of the blurred values; and responsive to determining that the fourth maximum score is greater than the third maximum score, outputting an indication that the third value does not match the fourth value.

17. The non-transitory machine-readable storage medium of claim 16, wherein the second field type is different from the first field type, and the operations further comprise:

determining, based on the second field type, additional blurring operations from the plurality of blurring operations, wherein the additional blurring operations is different from the plurality of blurring operations.

18. The non-transitory machine-readable storage medium of claim 10, wherein the first field type is a name, a postal code, a street address, a phone number, or a city name.

\* \* \* \* \*